United States Patent
D'Souza et al.

(10) Patent No.: US 11,222,434 B2
(45) Date of Patent: Jan. 11, 2022

(54) SYSTEMS AND METHODS FOR MEASURING BODY SIZE

(71) Applicant: Shopify Inc., Ottawa (CA)

(72) Inventors: Franklyn D'Souza, Toronto (CA); Jonathan Wade, Ottawa (CA); Juho Mikko Haapoja, Toronto (CA)

(73) Assignee: Shopify Inc., Ottawa (CA)

( * ) Notice: Subject to any disclaimer, the term of this patent is extended or adjusted under 35 U.S.C. 154(b) by 62 days.

(21) Appl. No.: 16/691,047

(22) Filed: Nov. 21, 2019

(65) Prior Publication Data

US 2021/0158557 A1    May 27, 2021

(51) Int. Cl.
*G06T 7/60* (2017.01)
*G06K 9/62* (2006.01)

(52) U.S. Cl.
CPC .............. *G06T 7/60* (2013.01); *G06K 9/6288* (2013.01); *G06T 2207/30196* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,321,728 B1* | 6/2019 | Koh | ....................... | G06T 11/203 |
| 10,458,773 B1* | 10/2019 | Eakins | ................ | G06Q 30/0623 |
| 2013/0249908 A1* | 9/2013 | Black | ....................... | G06K 9/48 |
| | | | | 345/420 |
| 2015/0154453 A1* | 6/2015 | Wilf | ......................... | G06K 9/46 |
| | | | | 382/103 |
| 2016/0314576 A1* | 10/2016 | Aliverti | .............. | G06Q 30/0621 |
| 2017/0046769 A1* | 2/2017 | Jackson | ............. | G06Q 30/0631 |
| 2018/0168261 A1* | 6/2018 | Weiler | ............... | G05B 19/4097 |
| 2020/0367590 A1* | 11/2020 | Istook | ...................... | A41H 1/02 |
| 2020/0397080 A1 | 12/2020 | Choche et al. | | |
| 2020/0401114 A1 | 12/2020 | Choche et al. | | |
| 2020/0402126 A1 | 12/2020 | Choche et al. | | |

OTHER PUBLICATIONS

"#017 Patent Drop", https://patentdrop.substack.com/p/017-patent-drop (accessed Jun. 11, 2021), Jan. 1, 2021, 9 pages.
"#028 Patent Drop", https://patentdrop.substack.com/p/028-patent-drop (accessed Jun. 11, 2021), Apr. 8, 2021, 8 pages.
"#032 Patent Drop", https://patentdrop.substack.com/p/032-patent-drop-shopify-microsoft (accessed Jun. 11, 2021), Jun. 7, 2021, 9 pages.

* cited by examiner

*Primary Examiner* — Zhiyu Lu
(74) *Attorney, Agent, or Firm* — GTC Law Group PC & Affiliates

(57) ABSTRACT

A computer-implemented method and system may include receiving one or more images of a body; determining one or more initial body measurements of the body based on the one or more images; determining at least one supplemental measurement of a portion of the body, the supplemental measurement determined at least in part using one or more sensors of a mobile device; and applying a correction factor to the one or more initial body measurements of the body based at least in part on the supplemental measurement to produce a corrected body measurement.

20 Claims, 13 Drawing Sheets

E-Commerce Platform

🔍 Search

JG John's Apparel / Jonny B. Good

🏠 Home
↩ Orders (652)
🏷 Products
👤 Customers
📊 Reports
🏷 Discounts
⊞ Apps

SALES CHANNELS ⊕
🏬 Online Store
📱 Mobile App
View all channels

Good afternoon, Jonny B..

Here's what's happening with your store today.

Today's total sales    Today's visits
$98.00                 1

● Update your Platform Payments tax details
We require additional information to verify your identity.
[Update tax details]

● Advanced Cash on Delivery has been deactivated for your store
[See why]

⚙ Settings

All channels ⌄        Today ⌄

TOTAL SALES
$98.00

$125
$75
$25
        12am    4am    8am    4pm    11pm
                                      Jun 1
                                      2 orders TOTAL SALES BY CHANNEL        View dashboard Online Store                  Jun 1
$0.00                         0 orders Mobile App
$0.00                         0 orders Shopify POS (126 York St.)
$0.00                         0 orders

FIG. 2

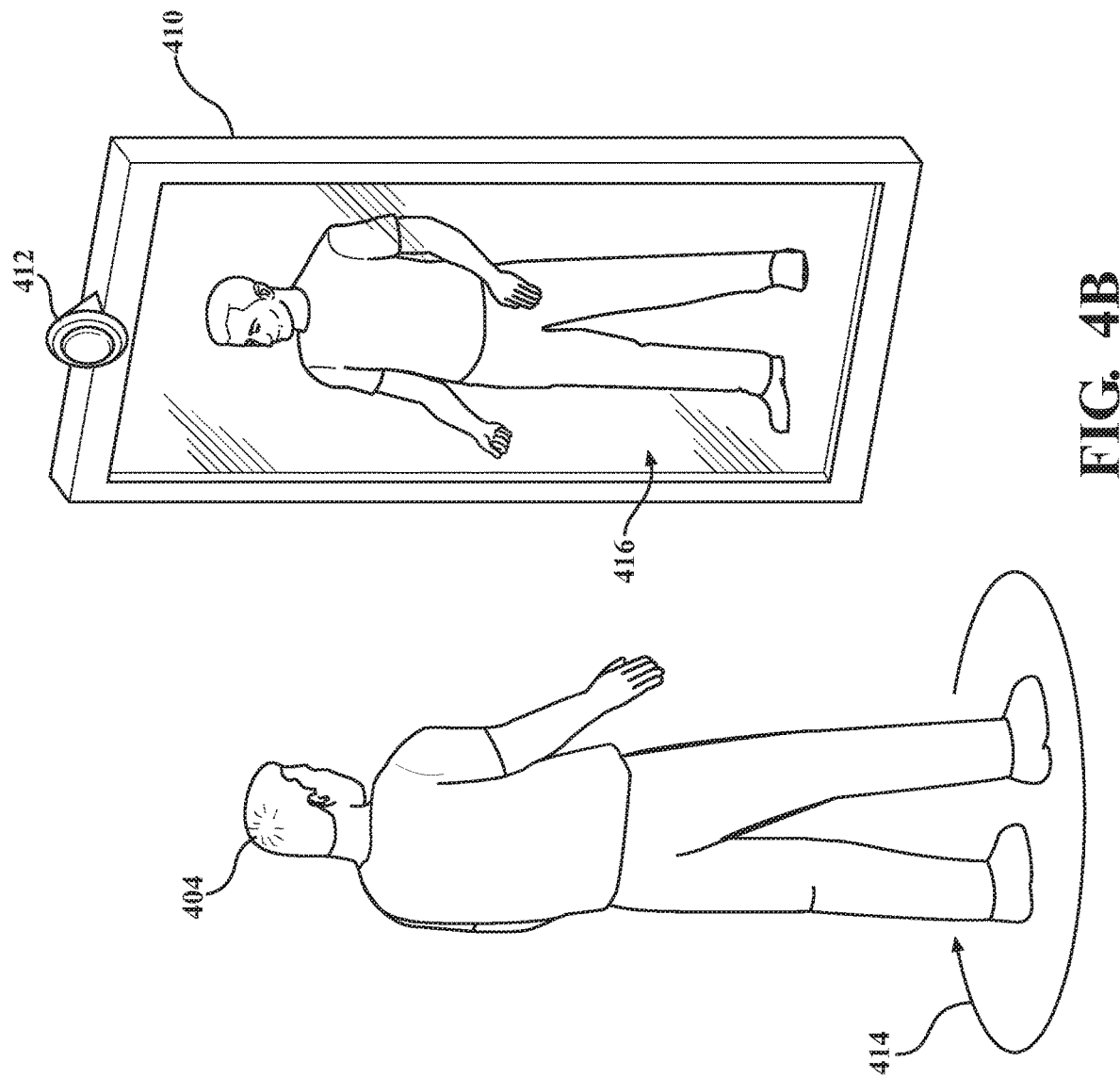

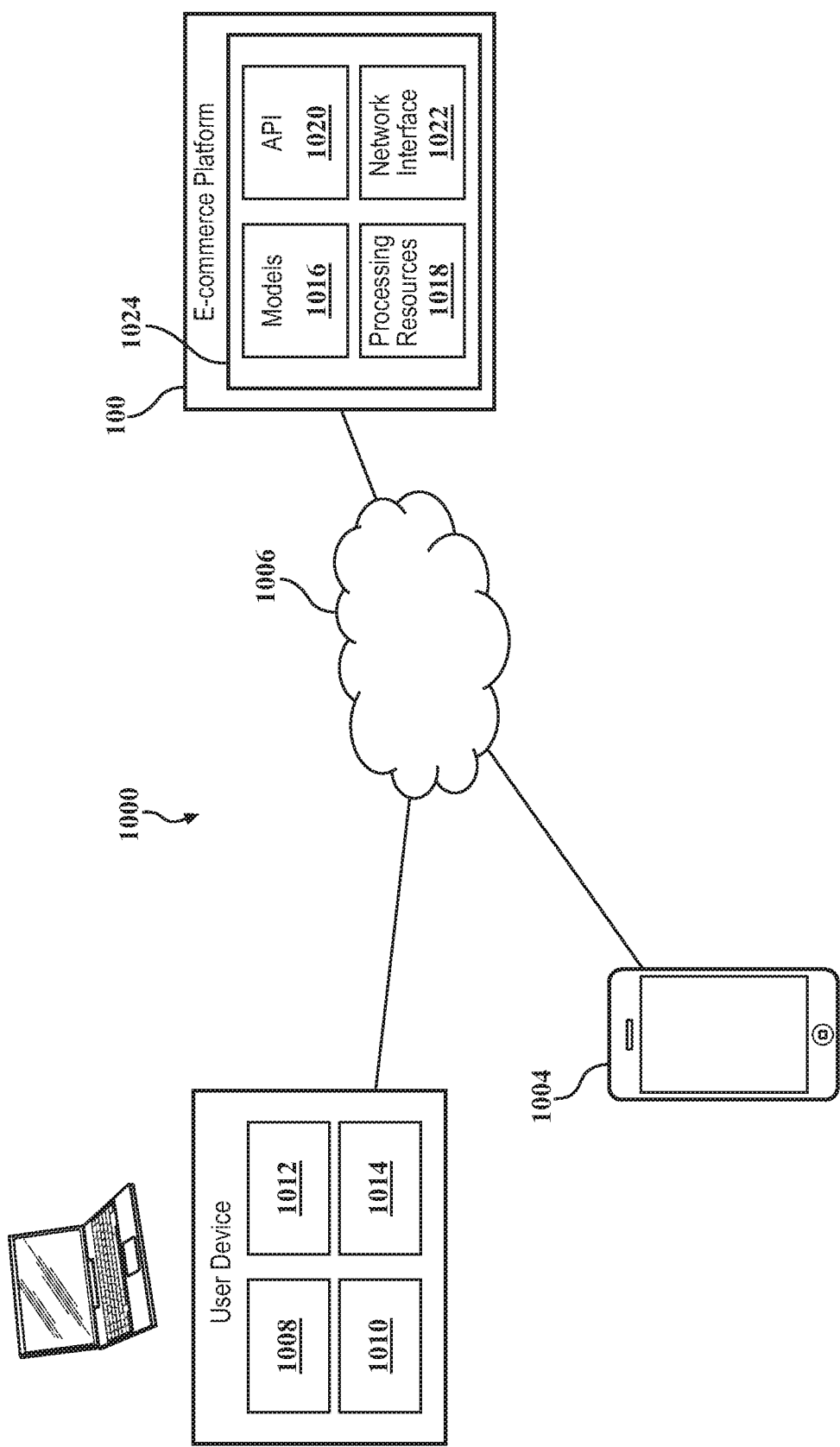

SYSTEMS AND METHODS FOR MEASURING BODY SIZE

FIELD

The present disclosure generally relates to measuring body size and more particularly to reducing measurement errors.

BACKGROUND

Sizing standards are not consistently applied between brands or types of clothing. A size large for one brand of clothing may be equivalent to a size medium in another brand. In physical stores, consumers may verify sizing by trying on the garment. For on-line or remote sales, consumers often rely on measurements of body parts to determine an appropriate fit. Accurate measurements of body parts are essential to ensure that appropriately sized clothing is provided to a person. However, body parts are irregular and difficult to measure using traditional methods. Consumers may find it difficult or cumbersome to determine accurate measurements. As such, there is a need for methods and systems to assist users in determining accurate body measurements.

SUMMARY

In an aspect, a computer-implemented method may include receiving one or more images of a body; determining one or more initial body measurements of the body based on the one or more images; determining at least one supplemental measurement of a portion of the body, the supplemental measurement determined at least in part using one or more sensors of a mobile device; and applying a correction factor to the one or more initial body measurements of the body based at least in part on the supplemental measurement to produce a corrected body measurement. In embodiments, the portion of the body may be a reference portion of the body. The method may include sending a size recommendation to a user device based on the corrected body measurement. The one or more images of a body may be from an augmented reality session and processing the one or more images may include determining an outline of the body from the one or more images. The supplemental measurement may be determined from detecting movement of the mobile device using the one or more sensors. The supplemental measurement may be determined from a movement of the mobile device using a camera of the mobile device. The supplemental measurement may be determined from additional images captured by the mobile device. The method may further include receiving sensor data from a second device, wherein the sensor data from the second device may include information regarding at least one of a location of the mobile device, a position of the mobile device, a location of at least a portion of the body, or a position of at least a portion of the body. The method may further include selecting the portion of the body to take the supplemental measurement; and providing a feedback instruction to the mobile device, the feedback instruction may provide an indication of proximity of the mobile device to the portion of the body. The feedback instruction may be based at least in part on data from the one or more sensors from a second device. The method may further include analyzing the received one or more images to determine one or more anomalies in the received images; and selecting at least one error model associated with the one or more anomalies. The one or more anomalies may cause an uncertainty in the one or more initial body measurements determined from the one or more images. The one or more anomalies may be due to at least one textile covering at least a portion of the body. The one or more anomalies may be due to at least one lighting artifact in the received images. The method may further include identifying a portion of the body for the supplemental measurement based on the selected at least one error model, selecting the portion of the body based at least in part on a threshold level of the uncertainty of the one or more initial body measurements, and selecting the portion of the body based at least in part on an age, gender, height, or weight. The method may further include selecting the portion of the body for the supplemental measurement; and providing a feedback instruction to the mobile device. The feedback instruction may provide an indication of proximity of the mobile device to the portion of the body. The feedback instruction may be associated with at least one of an audio, tactile, or visual notification. The correction factor may be based at least in part on a difference between the supplemental measurement and the one or more initial body measurements of the body. The correction factor may be determined for initial body measurements associated with at least one portion of the body covered by at least one textile. The correction factor may be based at least in part on a difference between the supplemental measurement and the one or more initial body measurements of the body and a style of clothing covering at least a portion of the body. The correction factor may be based at least in part on a difference between the supplemental measurement and the one or more initial body measurements of the body and a type of textile covering the body.

In an aspect, a system may include a computing device associated with an image processor, the computing device may be configured to store a set of instructions that, when executed, may cause the computing device to: receive one or more images of a body; process the one or more images to determine one or more initial body measurements of the body; determine at least one supplemental measurement of at least one portion of the body, the at least one supplemental measurement determined using one or more sensors of a mobile device; and determine a correction factor for the one or more initial body measurements of the body using the at least one supplemental measurement. In embodiments, the portion of the body may be a reference portion of the body. The instructions may further cause the computing device to send a size recommendation to a user device based on the corrected body measurement. The one or more images of a body may be from an augmented reality session. The instructions may further cause the computing device to determine an outline of the body from the one or more images. The supplemental measurement may be determined from detecting movement of the mobile device using the one or more sensors. The supplemental measurement may be determined from a movement of the mobile device using a camera of the mobile device. The supplemental measurement may be determined from additional images captured by the mobile device. The instructions may further cause the computing device to receive sensor data from a second device, the sensor data from the second device may include information regarding at least one of a location of the mobile device, a position of the mobile device, a location of at least a portion of the body, or a position of at least a portion of the body. The instructions may further cause the computing device to select the portion of the body to take the supplemental measurement; and provide a feedback instruction to the mobile device, the feedback instruction providing an indication of proximity of the mobile device to the portion of the body. The feedback instruction may be based at least in part on data from the one or more sensors from a second device. The instructions may further cause the computing device to analyze the received one or more images to determine one or more anomalies in the received images; and select at least one error model associated with the one or more anomalies. The one or more anomalies may cause an uncertainty in the one or more initial body measurements determined from the one or more images. The one or more anomalies may be due to at least one textile covering at least a portion of the body. The one or more anomalies may be due to at least one lighting artifact in the received images. The instructions may further cause the computing device to identify a portion of the body for the supplemental measurement based on the selected at least one error model. The instructions may further cause the computing device to select the portion of the body based at least in part on a threshold level of the uncertainty of the one or more initial body measurements. The instructions may further cause the computing device to select the portion of the body based at least in part on an age, gender, height, or weight. The instructions may further cause the computing device to select the portion of the body for the supplemental measurement; and provide a feedback instruction to the mobile device. The feedback instruction may provide an indication of proximity of the mobile device to the portion of the body. The feedback instruction may be associated with at least one of an audio, tactile, or visual notification. The correction factor may be based at least in part on a difference between the supplemental measurement and the one or more initial body measurements of the body. The correction factor may be determined for initial body measurements associated with at least one portion of the body covered by at least one textile. The correction factor may be based at least in part on a difference between the supplemental measurement and the one or more initial body measurements of the body and a style of clothing covering at least a portion of the body. The correction factor may be based at least in part on a difference between the supplemental measurement and the one or more initial body measurements of the body and a type of textile covering the body.

In an aspect, a computer-implemented method may include a method for correcting body dimensions determined from images. The method may include receiving one or more images from a computing device, wherein the one or more images each depicts a body; determining feature data corresponding to each of the one or more images; determining at least one initial body measurement of the body from the feature data; transmitting an indication to the computing device to obtain at least one supplemental measurement of at least one portion of the body; receiving the at least one supplemental measurement; determining a correction factor for the at least one initial body measurement of the body using the at least one supplemental measurement; correcting the at least one initial body measurement using the correction factor; and transmitting the corrected at least one initial body measurement to the computing device. The portion of the body may be a reference portion of the body. In embodiments, the portion of the body may be a reference portion of the body. The method may include sending a size recommendation to a user device based on the corrected body measurement. The one or more images of a body may be from an augmented reality session and processing the one or more images may include determining an outline of the body from the one or more images. The supplemental measurement may be determined from detecting movement of the mobile device using the one or more sensors. The supplemental measurement may be determined from a movement of the mobile device using a camera of the mobile device. The supplemental measurement may be determined from additional images captured by the mobile device. The method may further include receiving sensor data from a second device, wherein the sensor data from the second device may include information regarding at least one of a location of the mobile device, a position of the mobile device, a location of at least a portion of the body, or a position of at least a portion of the body. The method may further include selecting the portion of the body to take the supplemental measurement; and providing a feedback instruction to the mobile device, the feedback instruction may provide an indication of proximity of the mobile device to the portion of the body. The feedback instruction may be based at least in part on data from the one or more sensors from a second device. The method may further include analyzing the received one or more images to determine one or more anomalies in the received images; and selecting at least one error model associated with the one or more anomalies. The one or more anomalies may cause an uncertainty in the one or more initial body measurements determined from the one or more images. The one or more anomalies may be due to at least one textile covering at least a portion of the body. The one or more anomalies may be due to at least one lighting artifact in the received images. The method may further include identifying a portion of the body for the supplemental measurement based on the selected at least one error model, selecting the portion of the body based at least in part on a threshold level of the uncertainty of the one or more initial body measurements, and selecting the portion of the body based at least in part on an age, gender, height, or weight. The method may further include selecting the portion of the body for the supplemental measurement; and providing a feedback instruction to the mobile device. The feedback instruction may provide an indication of proximity of the mobile device to the portion of the body. The feedback instruction may be associated with at least one of an audio, tactile, or visual notification. The correction factor may be based at least in part on a difference between the supplemental measurement and the one or more initial body measurements of the body. The correction factor may be determined for initial body measurements associated with at least one portion of the body covered by at least one textile. The correction factor may be based at least in part on a difference between the supplemental measurement and the one or more initial body measurements of the body and a style of clothing covering at least a portion of the body. The correction factor may be based at least in part on a difference between the supplemental measurement and the one or more initial body measurements of the body and a type of textile covering the body.

In an aspect, a system may include a computing device associated with an image processor, the computing device may be configured to store a set of instructions that, when executed, may cause the computing device to: receive one or more images from a computing device, wherein the one or more images each depicts a body; determine feature data corresponding to each of the one or more images; determine at least one initial body measurement of the body from the feature data; transmit an indication to the computing device to obtain at least one supplemental measurement of at least one portion of the body; receive the at least one supplemental measurement; determine a correction factor for the at least one initial body measurement of the body using the at least one supplemental measurement; correct the at least one initial body measurement using the correction factor; and transmit the corrected at least one initial body measurement to the computing device. The portion of the body may be a reference portion of the body. In embodiments, the portion of the body may be a reference portion of the body. The instructions may further cause the computing device to send a size recommendation to a user device based on the corrected body measurement. The one or more images of a body may be from an augmented reality session. The instructions may further cause the computing device to determine an outline of the body from the one or more images. The supplemental measurement may be determined from detecting movement of the mobile device using the one or more sensors. The supplemental measurement may be determined from a movement of the mobile device using a camera of the mobile device. The supplemental measurement may be determined from additional images captured by the mobile device. The instructions may further cause the computing device to receive sensor data from a second device, the sensor data from the second device may include information regarding at least one of a location of the mobile device, a position of the mobile device, a location of at least a portion of the body, or a position of at least a portion of the body. The instructions may further cause the computing device to select the portion of the body to take the supplemental measurement; and provide a feedback instruction to the mobile device, the feedback instruction providing an indication of proximity of the mobile device to the portion of the body. The feedback instruction may be based at least in part on data from the one or more sensors from a second device. The instructions may further cause the computing device to analyze the received one or more images to determine one or more anomalies in the received images; and select at least one error model associated with the one or more anomalies. The one or more anomalies may cause an uncertainty in the one or more initial body measurements determined from the one or more images. The one or more anomalies may be due to at least one textile covering at least a portion of the body. The one or more anomalies may be due to at least one lighting artifact in the received images. The instructions may further cause the computing device to identify a portion of the body for the supplemental measurement based on the selected at least one error model. The instructions may further cause the computing device to select the portion of the body based at least in part on a threshold level of the uncertainty of the one or more initial body measurements. The instructions may further cause the computing device to select the portion of the body based at least in part on an age, gender, height, or weight. The instructions may further cause the computing device to select the portion of the body for the supplemental measurement; and provide a feedback instruction to the mobile device. The feedback instruction may provide an indication of proximity of the mobile device to the portion of the body. The feedback instruction may be associated with at least one of an audio, tactile, or visual notification. The correction factor may be based at least in part on a difference between the supplemental measurement and the one or more initial body measurements of the body. The correction factor may be determined for initial body measurements associated with at least one portion of the body covered by at least one textile. The correction factor may be based at least in part on a difference between the supplemental measurement and the one or more initial body measurements of the body and a style of clothing covering at least a portion of the body. The correction factor may be based at least in part on a difference between the supplemental measurement and the one or more initial body measurements of the body and a type of textile covering the body.

In an aspect, a computer-implemented method may include a method for correcting body dimensions determined from at least one image. The method may include receiving an image by a first computing device, wherein the image depicts a body; determining, by the first computing device, feature data corresponding to the body in the image; communicating the image and the feature data to a second computing device, wherein the second computing device is communicatively coupled to the first computing device; determining, by the second computing device, at least one initial body measurement of the body from the feature data; determining, by the first computing device, at least one supplemental measurement of one or more portions of the body; communicating the at least one supplemental measurement to the second computing device; determining, by the second computing device, a correction factor for the at least one initial body measurement using the at least one supplemental measurement; and correcting, by the first computing device or the second computing device, the at least one initial body measurement using the correction factor. In embodiments, the portion of the body may be a reference portion of the body. The method may include sending a size recommendation to a user device based on the corrected body measurement. The one or more images of a body may be from an augmented reality session and processing the one or more images may include determining an outline of the body from the one or more images. The supplemental measurement may be determined from detecting movement of the mobile device using the one or more sensors. The supplemental measurement may be determined from a movement of the mobile device using a camera of the mobile device. The supplemental measurement may be determined from additional images captured by the mobile device. The method may further include receiving sensor data from a second device, wherein the sensor data from the second device may include information regarding at least one of a location of the mobile device, a position of the mobile device, a location of at least a portion of the body, or a position of at least a portion of the body. The method may further include selecting the portion of the body to take the supplemental measurement; and providing a feedback instruction to the mobile device, the feedback instruction may provide an indication of proximity of the mobile device to the portion of the body. The feedback instruction may be based at least in part on data from the one or more sensors from a second device. The method may further include analyzing the received one or more images to determine one or more anomalies in the received images; and selecting at least one error model associated with the one or more anomalies. The one or more anomalies may cause an uncertainty in the one or more initial body measurements determined from the one or more images. The one or more anomalies may be due to at least one textile covering at least a portion of the body. The one or more anomalies may be due to at least one lighting artifact in the received images. The method may further include identifying a portion of the body for the supplemental measurement based on the selected at least one error model, selecting the portion of the body based at least in part on a threshold level of the uncertainty of the one or more initial body measurements, and selecting the portion of the body based at least in part on an age, gender, height, or weight. The method may further include selecting the portion of the body for the supplemental measurement; and providing a feedback instruction to the mobile device.

The feedback instruction may provide an indication of proximity of the mobile device to the portion of the body. The feedback instruction may be associated with at least one of an audio, tactile, or visual notification. The correction factor may be based at least in part on a difference between the supplemental measurement and the one or more initial body measurements of the body. The correction factor may be determined for initial body measurements associated with at least one portion of the body covered by at least one textile. The correction factor may be based at least in part on a difference between the supplemental measurement and the one or more initial body measurements of the body and a style of clothing covering at least a portion of the body. The correction factor may be based at least in part on a difference between the supplemental measurement and the one or more initial body measurements of the body and a type of textile covering the body.

In an aspect, a system may include a computing device associated with an image processor, the computing device may be configured to store a set of instructions that, when executed, may cause the computing device to: receive an image by a first computing device, wherein the image depicts a body; determine, by the first computing device, feature data corresponding to the body in the image; communicating the image and the feature data to a second computing device, wherein the second computing device is communicatively coupled to the first computing device; determine, by the second computing device, at least one initial body measurement of the body from the feature data; determine, by the first computing device, at least one supplemental measurement of one or more portions of the body; communicate the at least one supplemental measurement to the second computing device; determine, by the second computing device, a correction factor for the at least one initial body measurement using the at least one supplemental measurement; and correct, by the first computing device or the second computing device, the at least one initial body measurement using the correction factor. In embodiments, the portion of the body may be a reference portion of the body. The instructions may further cause the computing device to send a size recommendation to a user device based on the corrected body measurement. The one or more images of a body may be from an augmented reality session. The instructions may further cause the computing device to determine an outline of the body from the one or more images. The supplemental measurement may be determined from detecting movement of the mobile device using the one or more sensors. The supplemental measurement may be determined from a movement of the mobile device using a camera of the mobile device. The supplemental measurement may be determined from additional images captured by the mobile device. The instructions may further cause the computing device to receive sensor data from a second device, the sensor data from the second device may include information regarding at least one of a location of the mobile device, a position of the mobile device, a location of at least a portion of the body, or a position of at least a portion of the body. The instructions may further cause the computing device to select the portion of the body to take the supplemental measurement; and provide a feedback instruction to the mobile device, the feedback instruction providing an indication of proximity of the mobile device to the portion of the body. The feedback instruction may be based at least in part on data from the one or more sensors from a second device. The instructions may further cause the computing device to analyze the received one or more images to determine one or more anomalies in the received images; and select at least one error model associated with the one or more anomalies. The one or more anomalies may cause an uncertainty in the one or more initial body measurements determined from the one or more images. The one or more anomalies may be due to at least one textile covering at least a portion of the body. The one or more anomalies may be due to at least one lighting artifact in the received images. The instructions may further cause the computing device to identify a portion of the body for the supplemental measurement based on the selected at least one error model. The instructions may further cause the computing device to select the portion of the body based at least in part on a threshold level of the uncertainty of the one or more initial body measurements. The instructions may further cause the computing device to select the portion of the body based at least in part on an age, gender, height, or weight. The instructions may further cause the computing device to select the portion of the body for the supplemental measurement; and provide a feedback instruction to the mobile device. The feedback instruction may provide an indication of proximity of the mobile device to the portion of the body. The feedback instruction may be associated with at least one of an audio, tactile, or visual notification. The correction factor may be based at least in part on a difference between the supplemental measurement and the one or more initial body measurements of the body. The correction factor may be determined for initial body measurements associated with at least one portion of the body covered by at least one textile. The correction factor may be based at least in part on a difference between the supplemental measurement and the one or more initial body measurements of the body and a style of clothing covering at least a portion of the body. The correction factor may be based at least in part on a difference between the supplemental measurement and the one or more initial body measurements of the body and a type of textile covering the body.

In an aspect, a computer-implemented method may include receiving an image from a first computing device, wherein the image may depict at least a portion of a body; determining at least one initial body measurement from the image; determining uncertainty in the at least one initial body measurement, the uncertainty determined based at least in part on detected textiles covering at least a portion of the body in the image; receiving at least one supplemental measurement of at least one portion of the body from a second computing device and to correct the at least one initial body measurement based at least in part on the at least one supplemental measurement. In embodiments, the portion of the body may be a reference portion of the body. Providing feedback associated with the at least one supplemental measurement, the feedback may provide at least one of a visual, audio, or tactile indication of proximity of the second computing device to at least one portion of the body. The at least one supplemental measurement may be determined from at least one of a motion and position of the second computing device. The at least one of motion and position of the second computing device may be determined by at least one sensor of the second computing device, the at least one sensor chosen from a group consisting of: accelerometer, gyroscope, magnetometer, image sensor, and proximity sensor. The portion of the body may be a reference portion of the body. The method may include sending a size recommendation to a user device based on the corrected body measurement. The one or more images of a body may be from an augmented reality session and processing the one or more images may include determining an outline of the body from the one or more images. The supplemental measurement may be determined from detecting movement of the mobile device using the one or more sensors. The supplemental measurement may be determined from a movement of the mobile device using a camera of the mobile device. The supplemental measurement may be determined from additional images captured by the mobile device. The method may further include receiving sensor data from a second device, wherein the sensor data from the second device may include information regarding at least one of a location of the mobile device, a position of the mobile device, a location of at least a portion of the body, or a position of at least a portion of the body. The method may further include selecting the portion of the body to take the supplemental measurement; and providing a feedback instruction to the mobile device, the feedback instruction may provide an indication of proximity of the mobile device to the portion of the body. The feedback instruction may be based at least in part on data from the one or more sensors from a second device. The method may further include analyzing the received one or more images to determine one or more anomalies in the received images; and selecting at least one error model associated with the one or more anomalies. The one or more anomalies may cause an uncertainty in the one or more initial body measurements determined from the one or more images. The one or more anomalies may be due to at least one textile covering at least a portion of the body. The one or more anomalies may be due to at least one lighting artifact in the received images. The method may further include identifying a portion of the body for the supplemental measurement based on the selected at least one error model, selecting the portion of the body based at least in part on a threshold level of the uncertainty of the one or more initial body measurements, and selecting the portion of the body based at least in part on an age, gender, height, or weight. The method may further include selecting the portion of the body for the supplemental measurement; and providing a feedback instruction to the mobile device. The feedback instruction may provide an indication of proximity of the mobile device to the portion of the body. The feedback instruction may be associated with at least one of an audio, tactile, or visual notification. The correction factor may be based at least in part on a difference between the supplemental measurement and the one or more initial body measurements of the body. The correction factor may be determined for initial body measurements associated with at least one portion of the body covered by at least one textile. The correction factor may be based at least in part on a difference between the supplemental measurement and the one or more initial body measurements of the body and a style of clothing covering at least a portion of the body. The correction factor may be based at least in part on a difference between the supplemental measurement and the one or more initial body measurements of the body and a type of textile covering the body.

In an aspect, a system for determining at least one dimension of a body may include a measurement engine that is configured to receive an image from a first computing device. The image may depict at least a portion of a body. The measurement engine may be further configured to determine at least one initial body measurement from the image. The system may further include a correction engine that may be configured to determine uncertainty in the at least one initial body measurement, the uncertainty determined based at least in part on detected textiles covering at least a portion of the body in the image, the correction engine further configured to receive at least one supplemental measurement of at least one portion of the body from a second computing device and to correct the at least one initial body measurement based at least in part on the at least one supplemental measurement. In embodiments, the portion of the body may be a reference portion of the body. The system may further include a feedback engine that may be configured to provide feedback associated with the at least one supplemental measurement, the feedback providing at least one of a visual, audio, or tactile indication of proximity of the second computing device to at least one portion of the body. The at least one supplemental measurement may be determined from at least one of a motion and position of the second computing device. The at least one of motion and position of the second computing device may be determined by at least one sensor of the second computing device, the at least one sensor chosen from a group consisting of: accelerometer, gyroscope, magnetometer, image sensor, and proximity sensor. The portion of the body may be a reference portion of the body. The instructions may further cause the computing device to send a size recommendation to a user device based on the corrected body measurement. The one or more images of a body may be from an augmented reality session. The instructions may further cause the computing device to determine an outline of the body from the one or more images. The supplemental measurement may be determined from detecting movement of the mobile device using the one or more sensors. The supplemental measurement may be determined from a movement of the mobile device using a camera of the mobile device. The supplemental measurement may be determined from additional images captured by the mobile device. The instructions may further cause the computing device to receive sensor data from a second device, the sensor data from the second device may include information regarding at least one of a location of the mobile device, a position of the mobile device, a location of at least a portion of the body, or a position of at least a portion of the body. The instructions may further cause the computing device to select the portion of the body to take the supplemental measurement; and provide a feedback instruction to the mobile device, the feedback instruction providing an indication of proximity of the mobile device to the portion of the body. The feedback instruction may be based at least in part on data from the one or more sensors from a second device. The instructions may further cause the computing device to analyze the received one or more images to determine one or more anomalies in the received images; and select at least one error model associated with the one or more anomalies. The one or more anomalies may cause an uncertainty in the one or more initial body measurements determined from the one or more images. The one or more anomalies may be due to at least one textile covering at least a portion of the body. The one or more anomalies may be due to at least one lighting artifact in the received images. The instructions may further cause the computing device to identify a portion of the body for the supplemental measurement based on the selected at least one error model. The instructions may further cause the computing device to select the portion of the body based at least in part on a threshold level of the uncertainty of the one or more initial body measurements. The instructions may further cause the computing device to select the portion of the body based at least in part on an age, gender, height, or weight. The instructions may further cause the computing device to select the portion of the body for the supplemental measurement; and provide a feedback instruction to the mobile device. The feedback instruction may provide an indication of proximity of the mobile device to the portion of the body. The feedback instruction may be associated with at least one of an audio, tactile, or visual notification. The correction factor may be based at least in part on a difference between the supplemental measurement and the one or more initial body measurements of the body. The correction factor may be determined for initial body measurements associated with at least one portion of the body covered by at least one textile. The correction factor may be based at least in part on a difference between the supplemental measurement and the one or more initial body measurements of the body and a style of clothing covering at least a portion of the body. The correction factor may be based at least in part on a difference between the supplemental measurement and the one or more initial body measurements of the body and a type of textile covering the body.

In an aspect, a system may include a graphical user interface for displaying an image of a body and an indication for capturing a supplemental measurement of a portion of the body. The system may include a memory for storing an underlying software programming code for execution of the function. The system may include a processor for modifying the underlying software programming code; and the processor may alter the displaying the portion of the body based on the modifying of the underlying software programming code. In embodiments, the portion of the body may be a reference portion of the body. The indication may be a position on the body. The indication may be a path from a first position on the body to a second position on the body. The system may further include the graphical user interface displaying an error indication relative to the path.

In an aspect, a system may include a graphical user interface for displaying an image of a body and an indication of initial body measurements determined from the image of a body; an input facility for receiving user input for identifying at least one portion of the indication of the initial body measurements displayed on the graphical user interface; a memory for storing the received user input; and a processor for modifying the image of the body displayed in the graphical user interface according to the received user input. In embodiments, the indication may be an AR representation over the displayed image of the body. The indication may further include a depiction of uncertainty of each of the initial body measurements. The user input for identifying at least one portion of the indication of the initial body measurements may include dragging a portion of an outline of the body to change at least one of the initial body measurements.

BRIEF DESCRIPTION OF THE FIGURES

FIG. 2 depicts an embodiment of a home page of an administrator.

FIGS. 4A-4B depict configurations that may be used for capturing images.

FIG. 10 depicts an embodiment of a measuring system.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

Figure 1:
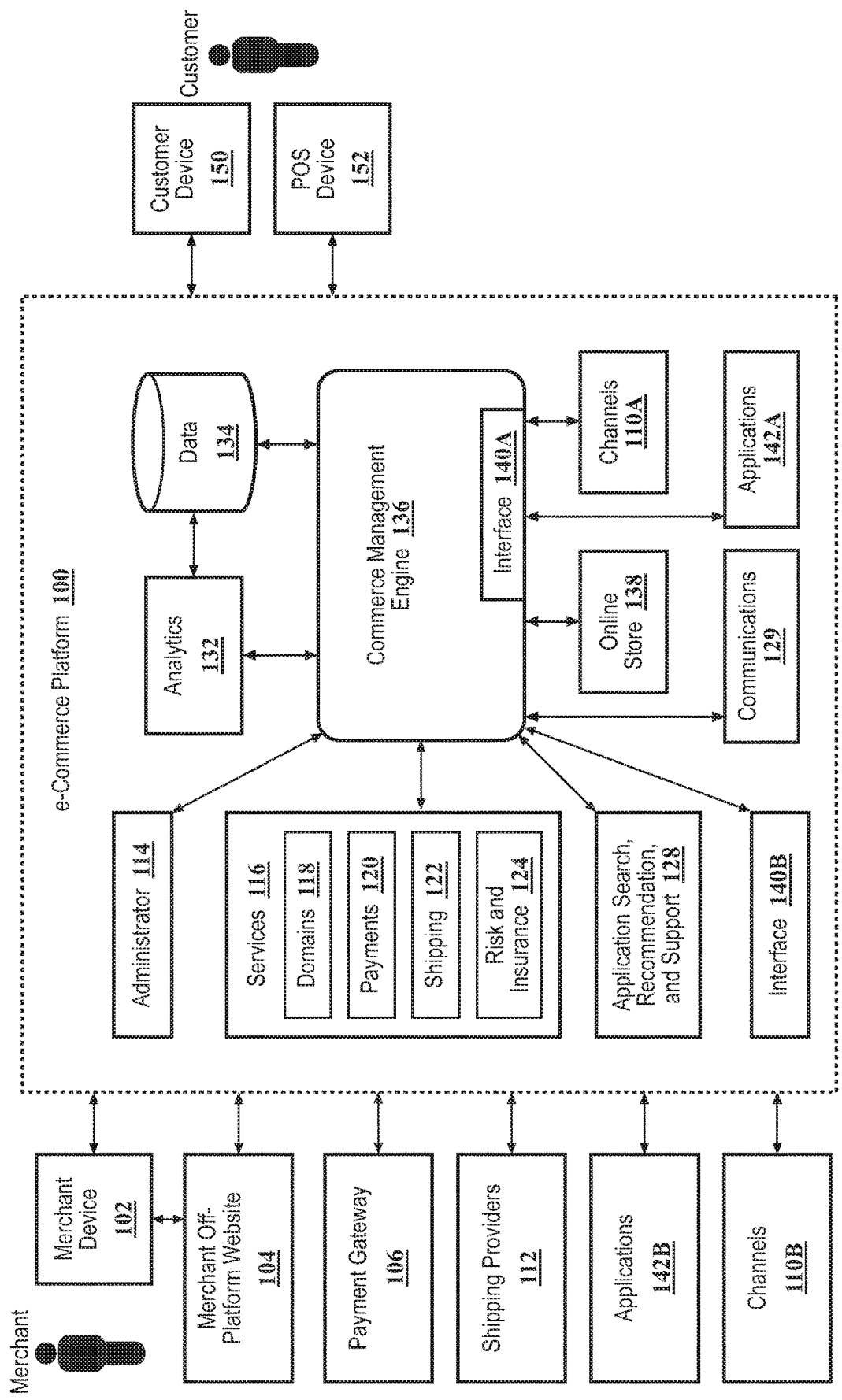
FIG. 1 depicts an embodiment of an e-commerce platform.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their web site through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

FIG. 2 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

In embodiments, the e-commerce platform 100 may receive user body measurements and provide recommendations, corrections, guidance, comparison and/or a list of products related to the measurements. For instance, for purchasing clothing through the e-commerce platform 100 a user may provide body measurements by direct methods to determine sizing for the purchase, such as providing measurements or sizing based on previous purchases, through a direct measurement of the user's body (e.g., using a tape measure), and the like. From these measurements a merchant may be able to determine sizing for a merchant product.

In some embodiments, initial body measurements may be determined through indirect methods. Indirect methods may include taking images of a person and determining the sizing of the person from the images. However, measurements using indirect methods may result in one or more errors in the body measurements. For instance, errors in measurement using indirect methods may result from body parts of the person being covered by clothing. For example, baggy clothing worn by a person may obscure body parts in the captured images. Loose clothing may enlarge the overall appearance of a person and may enlarge or distort the dimensions of body parts covered by the loose clothing. In another example, tight clothing such as compression tights, may change the shape or appearance of a person such that some dimensions may appear smaller than if the person was not wearing the clothing. A covering worn by a person, such as clothing, may distort the dimensions or proportions of the body and/or make it difficult to determine the exact start, end, or dimensions of body parts. The systems and methods described herein may be in relation to anything covering at least a portion of a body to be measured; for example, any textile, including clothing, fabric, plastics, synthetic materials, and the like. References to clothing herein include references to any covering or textile.

In embodiments, initial body measurements may be determined based on object detection such as 3D modeling data captured of a person (e.g. obtained as part of an augmented reality (AR) session with a mobile device). A 3D modeling capture may be initiated with the intent to determine a person's body sizing. For example, a person's body size may be determined based on 3D modeling data obtained or captured during the AR session (e.g. based on the detection of surfaces associated with the person's body). In other embodiments, initial body measurements may be determined based on other types of object detection techniques from which distances and/or dimensions of objects can be calculated or inferred such as from image or video captures obtained with a mobile device camera or sound, radio or electromagnetic signal sensors (e.g. sonar, radar, infrared). In the following description, reference will be made to the use of image data to determine body measurements, but it is understood that the principles described are equally applicable to other types of data captures or object detection techniques.

One problem with the following approach is that clothing worn by a person during a capture session may be baggy and may enlarge the size of the person. Measurements calculated for a person wearing clothing may result in measurements that are larger than the person's actual sizing. Small variations in sizing measurements can have a large impact in the creation and measurement of objects (e.g., clothing articles), especially when requiring high accuracy.

Sizing distortions may be corrected with direct measurement of the person's body. Direct measurements may be used as a representative measure of the actual size of the body. A user may be instructed to take one or more supplemental measurements. The supplemental measurements may be used to correct the measurements determined from the initial body images (e.g. using a correction factor) thus producing a more accurate set of body measurements. In embodiments, the direct and supplemental measurements may be obtained using one or more sensors of a mobile device.

In embodiments, initial measurements or initial body measurements may be any initial measurement for a body or a section, portion, or an aspect of a body and may form a basis for subsequent corrections. In embodiments, initial measurements may be determined from image data (e.g., from an AR or other capture session) or from predefined body models, as described herein. Errors in initial body measurements may be corrected with supplemental measurements. In some embodiments, images used to determine initial measurements may be analyzed to determine if a person in the images is wearing or is covered by clothing, such as loose or baggy clothing, that may result in errors in the initial measurements. A user may be instructed to take one or more supplemental measurements at one or more reference portions of the body. The supplemental measurements may be used to calculate a correction factor for the initial measurements to generate a corrected measurement. In embodiments, a supplemental measurement may be any measurement not determined from one or more initial measurements. Supplemental measurements may be taken, using device sensors (e.g., accelerometers in a mobile device), by taking additional images, or using traditional measuring tools such as rulers or measuring tape. In some embodiments, sensors of a mobile device may be analyzed during a movement of the mobile device along or in relation to a body part of the person to determine a supplemental measurement. The supplemental measurements may be used to determine at least one correction factor that may be applied to one or more initial body measurements to generate corrected body measurements.

Corrected body measurements may be used to provide sizing recommendations to the user. Using the corrected body measurements, the sizing recommendations may be adjusted for specific brands of clothing, types of clothing, and the like.

Figure 3A:
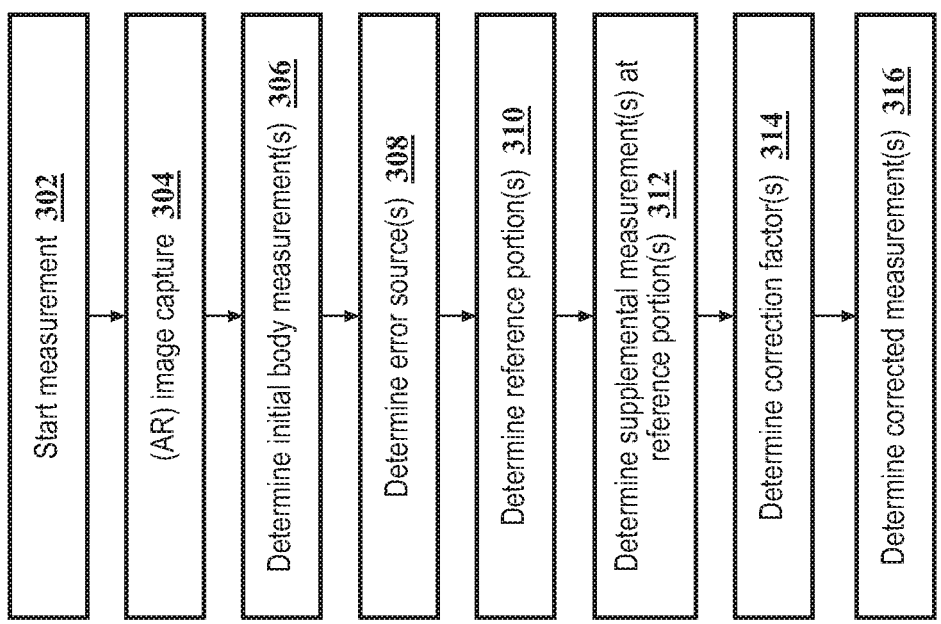
FIGS. 3A-3C depict embodiments of a process for determining body dimensions.

FIG. 3A depicts an overview of an embodiment of a process for determining body dimensions. The process may start with a user initiating a request to start body measurement 302, which may initiate an image capture 304 process. The process may continue with determining at least one initial body measurement from the captured images 306 as well as optionally determining at least one error source 308 (e.g. determining that a person is wearing clothes). Next, the process may identify at least one reference portion 310 to take one or more supplemental measurements, and one or more supplemental measurements may be made 312. In embodiments, a reference portion may be a body part or area of the body where a supplemental measurement is taken. For instance, a reference portion may be a point on a body (e.g., left side of the neck at the point where the neck is thinnest or top of the shoulder at the collar bone), a linear path (e.g., around the neck or from the top of the shoulder to the wrist), or an area (e.g., in the area of the left waist). Finally, using the one or more supplemental measurements, at least one correction factor for the at least one initial measurement may be determined 314, and the correction factor may be applied to the initial body measurements to generate one or more corrected body measurements 316. In embodiments, a correction factor may be any factor that is used to correct for an error in an initial measurement based on supplemental measurements. In embodiments, a corrected measurement or corrected body measurement may be any corrected, modified, altered, improved, or final body measurement as corrected in relation to a correction factor.

Generally, aspects of the measurement process may include systems and methods for performing one or more steps of determining initial body measurements from image data. Image data may be obtained from images, video, from 3D imaging process such as from an AR session, from predefined body models selected by the user, or the like. Additional steps may include taking supplemental measurements at one or more reference portions of a body. In some cases, steps may include determining the need for supplemental measurements and determining at which reference portion(s) to take the supplemental measurement(s). The supplemental measurements may be taken using a mobile device wherein the sensors from the mobile device provide data to determine measurements. The systems and methods may be configured to ensure supplemental measurement corresponds to the location of the desired reference portion(s). The initial measurements may be corrected based on a correction factor determined from the supplemental measurement.

The details and considerations associated with each step are further described below. The steps of the process, although shown to be arranged sequentially in FIG. 3A may be performed in a different order, in parallel, at different times. For example, the steps of determining supplemental measurements 312 may be performed in parallel with the step of performing initial body measurements 308. In some embodiments, some steps may be optionally performed. For example, the step determining reference portions 310 may not be required in some situations.

Figure 3B:
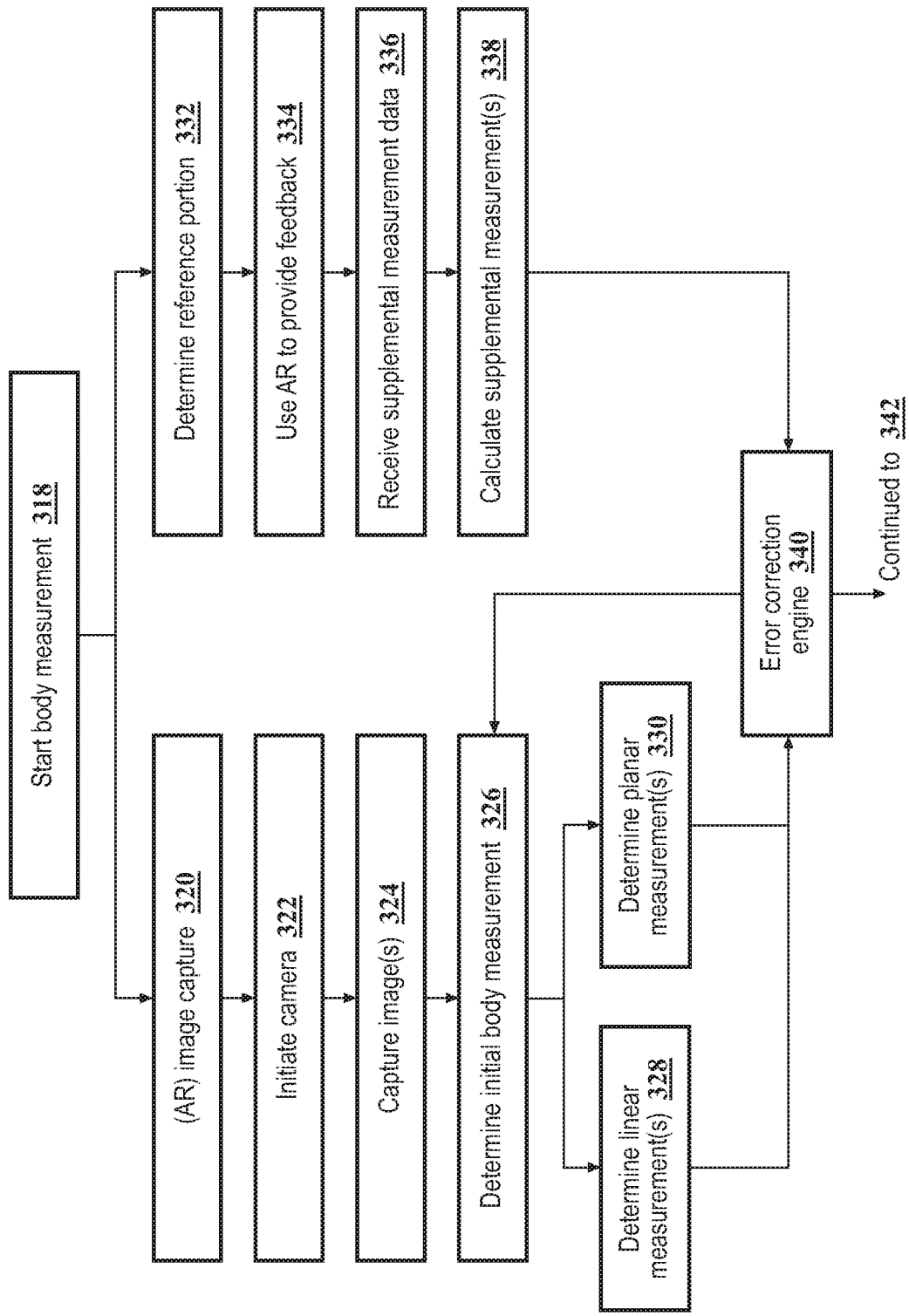
Figure 3C:
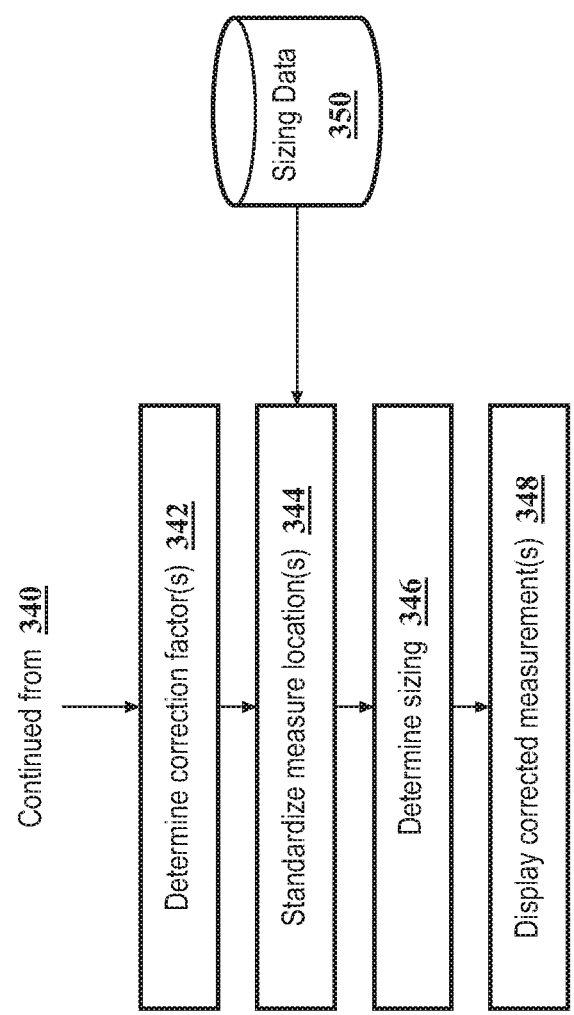

FIGS. 3B and 3C depict another overview of an embodiment of a process for determining body dimensions. Referring to FIG. 3B, the process starts at step 318 with the initiation of the body measurement process. From step 318, the process may follow two paths. One path determines one or more initial measurements, and a second path determines one or more supplemental measurements. The two paths may be performed in parallel or sequentially (in any order). In the path related to initial body measurements, the process may continue with AR or other image capture 320. An AR coordinate system may be defined for a space in which measurements are being taken. A camera may be initiated 322 and used to capture images 324 of a person during the AR session. The process may further determine initial body measurements 326 using the AR coordinate system and the initial images. Determining initial body measurements may include determining linear measurements 328, such as the length of an arm or a leg. Determining initial body measurements may include determining planar measurements 330, such as a circumference of an arm or a leg. The measurements may be provided to an error correction engine for processing 340.

In the parallel path as related to determining supplemental measurements, the process may continue with determining one or more reference portions 332 for taking supplemental measurements. In some embodiments, an AR session may be used to provide feedback 334 related to the reference portions. Feedback may be provided with respect to the start location, end location, or path related to the one or more supplemental measurements. In the next step, supplemental measurement data may be received 336. In some instances, a mobile device may be used to take supplemental measurements using sensor readings of the mobile device. In some instances, the supplemental measurement may require additional processing. In some embodiments, the supplemental data may be raw sensor data from which distances may be determined. In step 338, the supplemental measurement data may be used to calculate supplemental measurements. The calculated supplemental measurements from step 338 may be provided to an error correction engine 340. In some instances, the error correction engine may provide a feedback signal back to step 326. The feedback signal may include a request for specific planar or linear path measurement from the captured image data. In some cases, the error correction engine may determine which reference portions the supplement measurements correspond to and send a request to step 326 to determine initial body measurements that correspond to the supplemental measurements. The error correction engine 340 may process the supplemental measurements and initial body measurements to determine one or more error correction factors.

Continuing on FIG. 3C, the output of the error correction engine may be used to determine one or more correction factors 342. The one or more correction factors may be based, at least in part, on differences of the supplemental measurements and initial body measurements of reference portions of the body. The one or more correction factors may define how initial body measurements may be corrected to obtain corrected measurements of a person which may be used to determine sizing 346 for a person. The sizing information and/or corrected measurements may be displayed to a user 348.

In some embodiments, one or more correction factors may be used to standardize measure locations 344 based on sizing data 350. Sizing data may include sizing data that is available for specific clothing types or brands. Sizing data may specify that only certain aspects of sizing for some types of clothing are known or is important for a correct fit. The sizing data may be used to standardize measure locations. For example, body measurements for pants may be standardized such that measurements related to pants are taken, the measure locations include reference portions such as the waist circumference and/or inseam length.

With respect to FIG. 3A, a user may initiate an application on a user device such as a mobile device, computer, smart mirror, or the like to start a body measurement 302. A user may initiate body measurements using a graphical user interface and a touch screen, buttons, oral or written commands, gestures, and the like. In some embodiments, the process may start with the user accepting a request to start body measurement. The request may be initiated by an application or by the e-commerce platform and may be in response to a user browsing or attempting to purchase a product.

Once initiated, the measurement process may proceed with image capture 304. One or more images may be captured using camera sensors. During image capture 304 a camera may be configured to capture images continuously, periodically, or when triggered by the user. Image capture may refer to the capture of individual images, video, video clips, and the like. The camera used for image capture may be part of a user device such as a mobile device, computer, smart mirror, or the like or may be a separate device. Multiple cameras in one or more devices may be used for image capture. In some embodiments, a single image may be captured. In some embodiments, two or more, or ten or more, or even one hundred or more images may be captured. In the case of multiple images, images may be of the body or person at different angles, orientations, distances, lighting conditions, and the like. The images may be of different body parts taken from different angles, orientations, distances, lighting conditions, and the like.

In embodiments, the camera used to capture images may be stationary, and a user may be instructed or required to move such that the camera may capture images of the user at different angles, orientations, distances, lighting conditions, or used to capture different body parts. In embodiments, the camera may be movable such that the camera may automatically move or may be manually moved by a person to capture images at different angles, orientations, distances, lighting conditions or for different body parts.

In some embodiments, an application running on a user device during the image capturing process may guide or provide feedback to the user during the image capture or after images have been captured. The application may determine if the images capture the desired or required views of body parts of the user and if the captured images are of sufficient quality, and the like. The application may provide feedback to the user regarding if additional images should be captured or if enough images have been captured. The application may provide guidance to the user regarding which additional body parts, at what angles, orientations, distances, and/or lighting conditions should be captured.

Figure 4A:
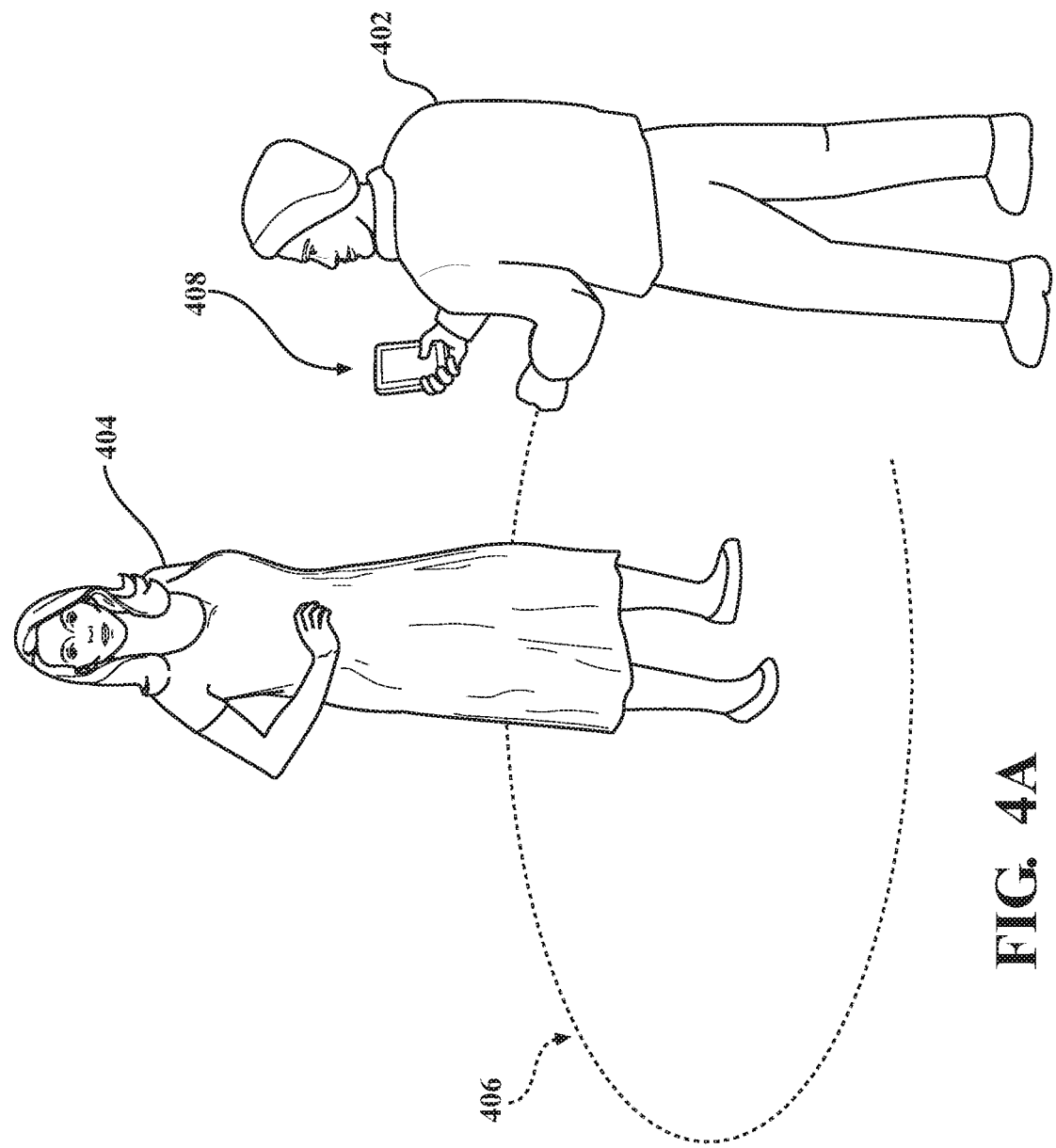

For example, FIG. 4A depicts one possible configuration that may be used to capture images. A mobile user device 408, such as a phone, tablet, camera, or the like, may be held or used by a first person 402. The first person 402 may capture images of another person 404, which is the subject of the measuring process. The first person 402 may move along various paths 406 around person 404 while capturing images with the mobile device 408 allowing the capture of images of different views or sides of the person 402, at different angles, orientations, distances, and/or lighting conditions.

In another embodiment, a device may be fixed or stationary, and the person that is the subject of the measuring process may move with respect to the camera. For example, FIG. 4B depicts another possible configuration that may be used to capture images. A user device 410, such as a smart mirror, phone, computer, or the like may use a camera 412 to capture images of a person 404 in front of the device 410. The device 410 may be stationary. The user device may provide an image 416 of the person 404. In the case of a mirror, the image 416 may be a reflection of the person 404. In the case of other devices such as computers or mobile devices, the image 416 may be shown on a screen of the device depicting the images that are being captured by the camera 412 of the device. The person 404 may move with respect to the device 410 along various paths 414 while images are being captured by the device 410, allowing the capture of images of different views or sides of the person 404, at different angles, orientations, distances, and/or lighting conditions. In another embodiment, a device may be a mobile device that can be manipulated by the person that is the subject of the measuring process. A user device may be used by the person to capture images of themselves. A user may capture images of themselves (i.e. selfies) or mirror reflections of their body or aspects of their body with the device from different views or sides of the body, at different angles, orientations, distances, and/or lighting conditions.

In embodiments, the number and types of images captured may depend on the types of body measurements that are being measured, the quality of the camera taking the measurements, the lighting conditions during image capture, the time allotted to take the images, the processing or storage capabilities of the device or associated devices capturing the images. The number and types of images may be predetermined. For example, a person may be instructed to capture two images, one image that is from the front and one that is from the back. In another example, a user may be instructed to capture three or more images.

In embodiments, the capture of images may be performed in association with an AR or mixed reality (MR) session. During image capture, the image available or captured by the camera may be displayed to the user as the images are captured. The displayed images may be augmented with additional virtual objects or elements which are not physically present. Virtual objects may be displayed on the screen, which may guide the user, provide additional information, or provide entertainment during the image capture.

In embodiments, images captured may be determined from or include 3D feature data derived from images taken of a person utilizing software configured for determining 3D modeling or feature data corresponding to one or more items in an image. Such software may be native to a computing device or additive thereto. For example, the software can be used in conjunction with computing devices having a camera and/or other sensors (motion sensor, gyroscope, accelerometer, etc.) in order to define a coordinate system, and to use the defined coordinate system to track changes of the position and orientation of the camera between different acquired images. In such a manner, each acquired image is associated with a corresponding position and orientation of the camera in the defined coordinate system. For example, the software (hereafter also referred to as "AR software") may determine a defined coordinate system (e.g., x, y, z cartesian coordinates) having its origin (0, 0, 0) corresponding to where a computing device camera for acquiring images is located when a first image is acquired. The AR software, in conjunction with sensor data, enables the tracking of a location and an orientation of the camera relative to the defined coordinate system.

Further, in embodiments, the AR software may also determine the existence of planar surfaces or other features for items in or aspects of the captured images. For example, such an AR software tool may exist on a customer computing device and may allow for feature points such as edges to be recognized, such as edges of clothing (e.g., a collar, sleeves, pockets) can be simply and easily determined. 3D feature data relating to items in the image is useful for calculating location and orientation of real and virtual objects with respect to the defined coordinate system. This 3D feature data may also be used for recalibrating one image with respect to another, such as where a computing device is located in the customer environment and acquires a second image that needs to be oriented with respect to a first image with the defined coordinate system and origin at a particular location or is moved to a different physical location at a different point in time and needs to be oriented with respect to a coordinate system used at another point in time.

The 3D feature data may be used to coordinate images or video between two or more devices that may be used for image capture. Multiple devices that are used in the same AR session may share the same coordinate system and the same origin. Features or objects recognized by each device may be recognized as being in the same location in the coordinate system. Devices that are in the same AR session may share the location of objects or features such that devices may leverage the processing and detection performed by other devices in the session. The 3D feature data may be used to coordinate images or video taken at different times with one or more devices. A coordinate system and origin may be maintained between sessions such that images or video captured at different times may be associated with the same coordinate system. Features or objects recognized in each image may be recognized as being in the same location in the coordinate system even when the images or video may have been taken in different AR sessions or at different times (such as with the same device).

The 3D feature data may or may not be communicated to the merchant computing device or to the e-commerce platform. Components of the application using the data from the AR software may be located at various locations, such as at the customer computing device, at the merchant computing device, at a remote server, or at any combinations of these locations and the overall architecture may be peer-to-peer or involve a server or cloud computing resources.

In embodiments, the AR data acquired may include camera position and orientation relative to origin of surfaces that are detected by the software as well as the size and orientation of those detected surfaces. For example, if a customer supplied image depicts a person, the AR data may include dimensions of the person or specific dimensions of features such as pockets or sleeves as well and orientation of features relative to the determined coordinate system. If a customer wants to view an augmented image in the customer environment, but using a new image, the AR software is enabled to identify 3D feature points in the new image and line up the new image with respect to the defined coordinate system of the previous image such as by using, at least in part, 3D feature data of the previous image.

In embodiments, the captured images, which may include individual images, video, or video clips, may be temporarily stored or permanently stored on the user device or other parts of the e-commerce platform. The captured images may be stored and then processed to determine measurements from the images. In some embodiments, the captured images may be processed as soon as they are captured, such that the images are only stored during the processing and discarded as soon as the processing of the image is completed. In embodiments, the images may only be stored in temporary memory. In some embodiments, the images captured may be processed in real-time or substantially in real-time. In some instances, privacy settings specified by the user, the platform, or other entities may dictate which images may be stored, which data may be derived from images, and any restrictions regarding how and where the images are stored or processed.

In some embodiments, images may be captured at different times or at different locations. In some embodiments, instead of capturing new images, a user may provide or specify the location of existing images that were captured at a different time.

Returning to FIG. 3A, after image capture 304, the process may proceed to processing the images to determine one or more initial body measurements 306. Those skilled in the art will appreciate that there are a variety of techniques and algorithms for determining the sizes of objects from images that may be applied to the captured images as described herein. Processing of captured images to determine one or more initial body measurements may include pre-processing of images. Pre-processing of images may include changing contrast, saturation, or the like of the images and may involve edge detection, and other means to determine an outline of a body or one or more body parts in an image. Pre-processed images may be analyzed to determine initial body dimensions. Measuring methods may include methods based on a comparison of elements to objects of known sizes, optical analysis, and the like.

In some embodiments, initial body measurements may be determined from predefined models. Users may be presented with different images (such as in 2D or 3D) that represent a series of different body types and/or sizes. A user interface may be presented to the user, which may allow the user to select one or more body models that appear to match the user's body type. The body models may be presented through a hierarchical collection of body types and sizes. The user may specify the overall body type they believe best represents them, such as pear-shaped, slender, skinny, and the like. Additional options may be used to provide more information such as arm length, shoulder size, leg size, and the like. The models may provide data regarding relative proportions of body parts. In some embodiments, the user may be required to specify their height and/or weight. Based on the weight and height of the user, the selected predefined model may be used to determine the initial body dimensions of the user. For example, the predefined model may specify that according to the model, the size of the waist is 0.4 times the overall height of the person. Once the user enters their actual height, the size of the waist may be determined by multiplying the height of the user by 0.4.

In another embodiment, predefined human models may be matched to one of the images of the user. The user could take a picture of themselves and/or provide descriptive information (such as in response to questions), and a body-type selection engine would match the user's photo image to a body type, from which the user could then refine the selection. Based on information such as the weight and height of the user, the predefined model matched to the image of the user may be used to determine the initial body measurements of the user.

Referring to FIG. 3A, after initial body measurements are determined 306 from captured images, an AR/MR session, predefined body models, or other approaches, the initial body measurements may be analyzed along with any captured images to determine the likelihood of errors or discrepancies in the initial measurements and possible sources of errors in the measurements 308. When one or more inconsistencies or uncertainties are found in the initial body images or the captured images, the user may be prompted or instructed to take one or more supplemental measurements.

In embodiments, the captured images may be analyzed to determine the lighting quality of the images. Lighting quality in the images may affect edge detection. In a dark image, the edge of the person with respect to the background may be difficult to determine. When the edge of the person in the image is determined for initial body measurements, the edge may not be accurate and may distort the initial body measurements. When lighting conditions are determined to be below a threshold for at least a portion of the captured images, the initial body measurements may be marked or associated with uncertainty. In such cases, the user may be prompted or instructed to take one or more supplemental measurements. In embodiments, images may be analyzed to determine if the captured images may include anomalies or features that may cause measurement errors such as due to camera angles, camera jitter, background interference, camera resolution, sensor resolution, and the like.

In embodiments, the captured images may be analyzed to determine if any covering of the user, such as clothing, may be detected in the captured images. The images may be analyzed to determine what type of clothing is worn by the user or covering the body. Colors, textures, designs, patterns, and the like of the clothing may be determined from the captured images. In some embodiments, the shape colors, features, lines, and the like may be used to determine what type of clothing is worn by the person. Different types of clothing may affect the visual appearance of a person and may cause various distortions of body measurements.

Items such as sweaters, skirts, shirts, blouses, dresses, and other types of clothing may be detected. Each type of clothing may be associated with a clothing model. The clothing model may provide a predetermined, known, or expected behavior of the clothing. In some embodiments, the clothing model may provide information regarding how the type of clothing may affect specific body measurements readings when worn by a person. The clothing model may identify a range of expected distortions that may be found with a specific clothing type. In some cases, the clothing model may provide for a correction factor. In some embodiments, the clothing model may identify which body measurements may be affected by the clothing. In embodiments, a detected clothing model may trigger the supplemental measurement. In embodiments, a recognized clothing model may trigger a supplemental measurement of specific body parts.

For example, a clothing model may include a clothing model of a dress. Some dresses may provide for a tight fit around the torso of person but are often loose around the legs. A dress with the form described may result in a distortion of initial body dimensions. The distortion of initial body dimensions may be different for different body parts. A dress that is tight-fitting around the torso of a person will not significantly affect the waist outline of a person in a captured image. A dress that is right fitting around the torso of a person may result in a small or negligible distortion of body measurements associated with the torso of the person when the initial measurements are determined from a captured image. A dress that is loose around the legs may result in significant or large distortion of initial measurements of the legs. The hanging nature of a dress may obscure an outline of individual legs in an image. Initial body measurements of legs of a person wearing a dress may result in inaccurate initial body measurements of legs. The clothing model of a dress may specify that initial body measurements of a person wearing a dress may be inaccurate for body measurements below the waist. The clothing model of a dress may specify the degree of distortion that may occur due to the clothing, distortion to specific body measurements in the model may be specified in absolute or relative terms. For example, in the tight-fitting torso area of the dress, the distortion of initial body measurements due to the dress may be specified as causing a distortion of 10% in that dimension, or the distortion may be defined as being an expected distortion of one centimeter.

Patterns, colors, and textures detected in images may be used to determine which parts of a person are covered by clothing and/or which parts are covered by the same clothing or textile. For example, a dress shirt may have a plaid pattern. The pattern of the shirt may be detected and found to cover the torso and arms of the person in the images. From the images and determination that the arms covered, the type of clothing may be determined as a long sleeve shirt.

Figure 5:
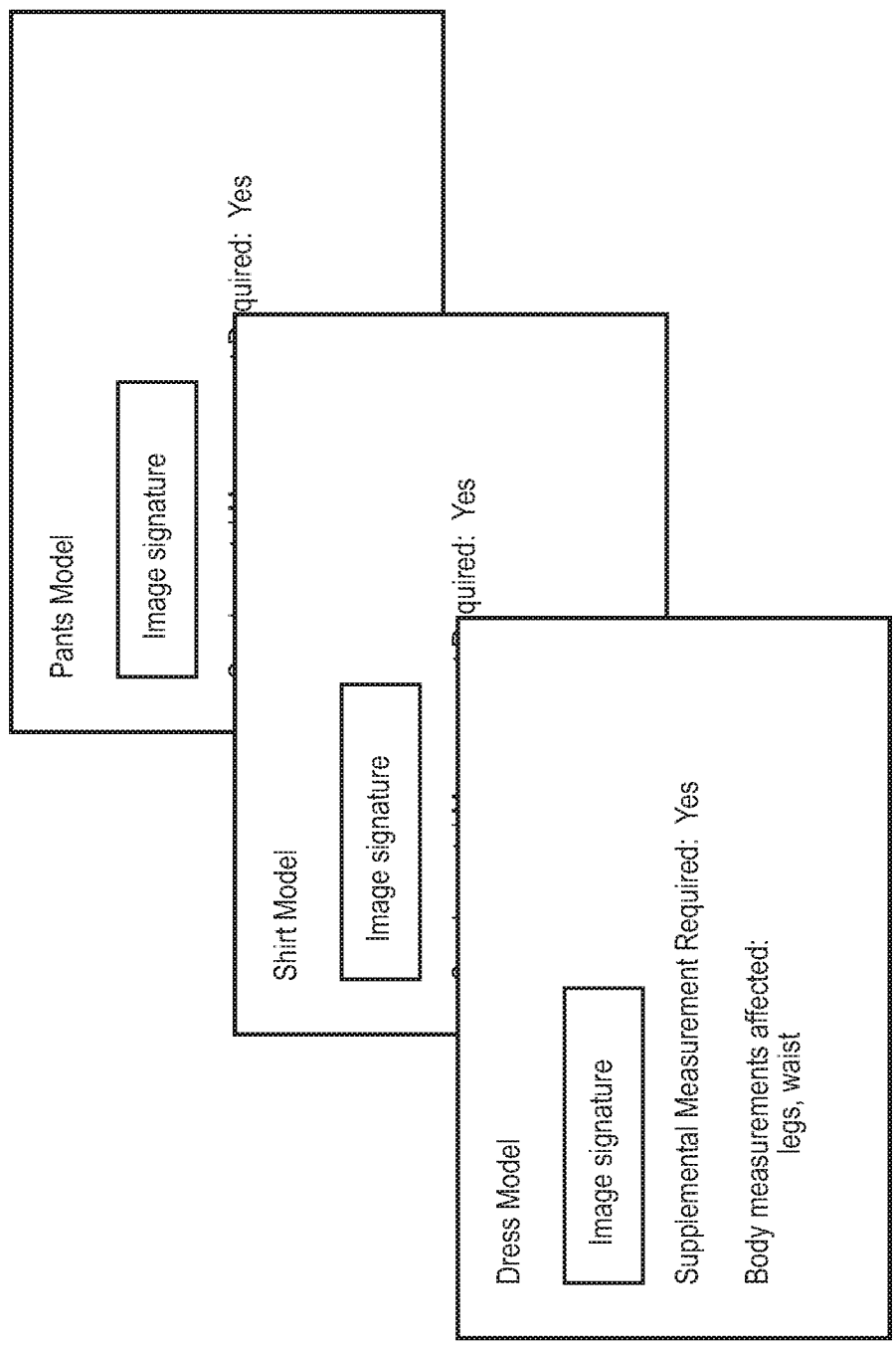
FIG. 5 depicts a collection of clothing models.

FIG. 5 depicts a collection of clothing models that may be used during error detections. Clothing models may correspond to specific types of clothing or categories of clothing. Clothing models may include individual data records, which groups properties and data associated with a particular type of clothing or categories of clothing. In one embodiment, a clothing model may include an image signature. The image signature may define characteristics of the clothing that may be used by image recognition software to detect the clothing in captured images. Each clothing model may further specify if and/or how the respective clothing may affect the accuracy of initial body measurements. A model may include a flag or a Boolean value that indicates that the detection of the clothing may require supplemental measurements. The model may further define which initial body measurements may be affected by the clothing and may provide a list of one or more reference portions of a body that may be prioritized or considered for taking supplemental measurements. This data could be stored in memory in the form of a table or other data structure with multiple entries, where each entry contains information corresponding to a respective model.

In embodiments, captured images may be analyzed to determine the behavior of clothing, textiles, or fabric covering aspects of a body. Textiles such as fabric may fold, create pleats, hang, or extend beyond the body of a person. Such behavior or features of textiles may cause distortions to initial body measurements. In some cases, detected clothing type that normally would not be associated with distorted initial body measurements may result in distorted body measurements due to the behavior of the clothing. For example, a tight-fitting shirt might normally cause minimal distortion of initial body measurements since the textile of the shirt normally is close to the skin of the person wearing the shirt. However, a fold or crease of the textile of the shirt may cause the textile to extend away from the skin or body surface of the person wearing the shirt. Initial body measurement in an area where a textile has a fold, or a pleat may be distorted by the additional distance the fold or pleat causes the textile to extend away from the skin of the person. Behavior such as bunching of clothes, pleats, unnatural curvature of the textile may prompt a user to take a supplemental measurement.

In some embodiments, the detection of clothing, behavior of clothing may be detected during an AR session. As a user is capturing images or is viewing images via an AR session, object detection may be performed, and specific clothing or behavior of textiles identified to the user. In some cases, the user may provide feedback if the clothing was correctly identified. In some cases, behavior in clothing such as pleats or detected obstructions may be identified to the user so that the user may change position, move, stretch, or modify how the clothing or textiles appear in the images or AR session.

In some embodiments, the detection of clothing and/or behavior of clothing may be detected from captured images. As images are being captured and/or viewed, object detection may be performed. Image data may be analyzed to identify one or more features in the images. The feature data may be compared to image signatures associated with the clothing models or behavior of clothing. In some embodiments, a notification may be provided to the user regarding specific clothing or behavior of textiles. In some cases, the user may provide feedback if the clothing was correctly identified. In some cases, behavior in clothing such as pleats or detected obstructions may be identified to the user so that the user may change position or take additional images. In some cases, the user may not be able to take additional images or fix the detected behavior; in such instances, the identified portions may be associated with a flag or an identifier that indicates the portions as potential areas for supplemental measurement.

In some embodiments a user may enter characteristics of the clothing the user is wearing using an interface on the user device. The user may specify, using one or more drop down menus, drill down menus, or other selection interfaces, the types of clothing, the sizes of clothing, and the like. The input from the user may be used to determine one or more clothing models.

In some embodiments, initial measurements may be analyzed to detect inconsistencies or errors in the initial measurements. Initial body measurements may be analyzed and compared to a database of known, typical, or expected body measurements. Initial body measurements may be compared to a database of expected values of human proportions. Proportions or dimensions that deviate from the normal dimensions or are different from the normal dimensions by a specific deviation may be flagged as possibly erroneous. The database of normal dimensions may be further categorized or associated with gender, age, race, fitness level, weight, country of origin, past measurements or the like or the person. Information entered by the user, received from the user profile, or determined from object analysis in captured images may be used to refine or filter the database of expected body dimensions.

Errors detected in initial body measurements, lighting or distortions in captured images, detection of clothing, and/or detection of textile behavior in captured images may cause the system to initiate or prompt the user to take supplemental measurements. In some embodiments, supplemental measurements may always be taken regardless of any discrepancies in initial measurements or detected clothing or behavior of textiles detected in captured images.

Supplemental measurements may be taken to verify initial body measurements. Supplemental measurements may be taken to correct one or more initial body measurements. Supplemental measurements may be taken to determine a correction model to modify or correct one or more initial body measurements.

Before supplemental measurements are taken, at least one reference area of the body to take the supplemental measurements may be determined 310. In some embodiments, a user may decide where to take supplemental measurements. The supplemental measurement and any correction resulting from the measurement may be reactive to the user action.

In some embodiments, the system may select one or more specific reference areas for the user to take supplemental measurements. The supplemental measurement and any correction of initial body measurements resulting from the supplemental measurement may be predictive. Supplemental measurements may be performed in predefined areas, such as areas with most significant uncertainty in initial body measurements, areas that provide most correction, area of the body most accessible, or least obtrusive for a user to measure. In some cases, disability of the user, age or motor function may be a factor when selecting specific reference areas for supplemental measurement.

The reference area selected by the system for a supplemental measurement may be based on the type of clothing the user is considering in buying. For some types of clothing, one or more body measurements may be critical for a good fit. The critical measurements may be given a priority when reference areas are selected. In some embodiments, random reference areas may be selected by the system for which the user may be directed to take a supplemental measurement.

Supplemental measurements of reference portion may be taken using various techniques. In one embodiment, sensors of a mobile device may be used. A mobile user device such as a smartphone, tablet, camera, and the like are often equipped with various sensors. The mobile device often includes one or more sensors such as an accelerometer, gyroscope, magnetometer, proximity sensor, touch screen sensor, microphone, light detector, camera, infrared camera, and the like. One or more of the sensors may be used to take supplemental measurements of one or more reference portions of the body. In one embodiment, a user may move the mobile device with respect to one or more reference portions to be measured. The sensors in the device may determine various factors while the device is being moved. The sensors in the device may determine the distance of the movement, the path of the movement, the orientation of the device, the relative position of the device with respect to the body of the person, and the like. One or more of these factors may be used to calculate a body measurement.

For example, using an accelerometer of the device, the start of a movement event, and stopping movement event of the device may be detected. The velocity and time of travel of the device during the movement may be determined from the accelerometer readings and/or other sensors. Such data can be used to determine the distance the mobile device was moved between the start and stop events. A user may be instructed to take a supplemental measurement of a specific reference portion by placing the mobile device at the start of the reference portion, starting the device at the start, moving the device to the end of the reference portion, and stopping the device when at the end.

When the mobile device is used for taking supplemental measurements, the supplemental measurements may be more accurate than initial body measurements determined from captured images. As described herein, initial body measurements determined from captured images may be distorted or erroneous due to clothing worn by the user in the images. Clothing may cover or extend from the body, adding extra distance to the measurements. When a mobile device is used to take supplemental measurements, the measurements may be taken such that extra distance, which resulted in the error in the initial measurements, is not measured. When the motion of the mobile device is used to take a supplemental measurement, the mobile device may be pressed against the body of the user, compressing the clothing or textile that is worn by the person, thereby reducing the error caused by the clothing.

In another example, a camera of the mobile device may be used to take supplemental measurements. A camera of a mobile device may be directed at the start of a reference portion to be measured. The camera may be directed such that the camera is within 2 cm or less or within 10 cm or less from the surface of the reference portion. The camera of the mobile device may be used to capture specific patterns on the clothing of the fabric. The camera may be used to capture a print pattern, a weave pattern, or the like. When the mobile device is moved, the camera may be used to count the number of print patterns or fabric weave patterns that passed the field of view of the camera when the mobile device was moved from the start of the reference portion to the end of the reference portion. Based on the number of patterns detected during the movement, and the size of the pattern, the distance of movement of the mobile device may be determined.

In some embodiments, a supplemental measurement may be used to measure one or more properties or behavior of textile or piece of clothing worn by a user. A supplemental measurement may be taken to determine how far a textile, or a portion of clothing extends away from the body. A supplemental measurement may be taken to identify the thickness of the textile of a piece of clothing, the stiffness of a textile, and the like. Supplemental measurements of the one or more properties of the textile or piece of clothing may be used to correct errors in initial body measurements, which may have been caused by uncertainty due to clothing or textiles covering the body.

A supplemental measurement for measuring properties of a textile may use an object (such as another body part) to poke or press a textile or a piece of clothing at a reference portion and use a camera of a mobile device to record the behavior of the textile when the reference is pressed. The object may be used to push a reference portion perpendicularly to the surface of the body of the user. The object may be pressed against the clothing until the clothing is moved or compressed to the degree that further pressing the object would not further move or compress the clothing or textile. During the press event a camera may record and analyze images of the object that is used and the deformation or movement of the clothing. The images may be analyzed to determine deflection parameters, which reflect how much the object was moved, how the textile deformed or moved around the object. Based on the deflection parameters the thickness of the textile and other properties of the textile may be derived. In another embodiment, a section of textile or clothing may be squeezed between two or more fingers compressing the textile. The compression and deformation of the textile around the fingers may be captured with a mobile camera and analyzed to determined deflection parameters.

In another embodiment, a supplemental measurement for measuring properties of a textile may use the motion of a mobile device. An edge of a mobile device may be positioned such that it touches the surface of a textile at a reference portion. The device may then be pushed substantially perpendicularly to the surface of the body at the reference portion until the textile is compressed. The sensors of the device may be used to measure the distance the mobile device moved from the surface of the textile until the textile was compressed against the surface of the body.

In embodiments, supplemental measurements may include point measurements, linear measurements (such as limb length), circumference measurements (such as the circumference of legs, waist, neck, torso, arm and wrist) and planar measurements (such as an area of the chest or back).

In some embodiments, supplemental measurements may be taken using traditional methods by measuring with a ruler, tape, string, and the like.

In embodiments, supplemental measurements may be determined for specific reference portions of the body. In some cases, the supplemental measurements may need to correspond to the exact reference portion. In some embodiments, a user may be guided to use a mobile device to measure specific reference portions. A user may be guided to a reference portion where supplemental measurement is to be taken. In the case where the mobile device is used to take supplemental measurements, the mobile device may provide feedback to the user such that the user positions the mobile device at the correct start of the reference portion.

In embodiments, additional guiding and feedback may be provided during the supplemental measurement and at the end of the process. Feedback may be provided from the mobile device and may be in the form of audio (e.g., sounds, prompts), visual (e.g., color, arrows), or tactile (e.g., vibration).

In embodiments, the user may be provided with tutorials of how to measure specific reference portions. Video tutorials or story-based tutorials may be provided to the user before a particular part of the body is measured. The tutorials may identify the specific start or end portions of the reference portion to be measured and any tips or tricks for measuring a specific area.

In an alternative embodiment, a user may select a reference portion to measure. The user may choose the start and end portions of the reference portion. The user may perform the measurement, and after the supplemental measurement is taken, the user may provide information as to which reference portion was measured. Users may specify, from a list of reference portions, as to which one was measured. The user may specify the exact starting point and ending point, which was used for measuring the reference portion. A graphical user interface with an image of the person may be shown on which the user may specify the locations of the starting and ending points.

For example, the reference portion to be measured may be the circumference of the torso of a person. A user may be instructed to press the mobile device to their chest at a specific location. While pressing the mobile device to the body, the user may be instructed to move the mobile device around the torso. The user device may be configured to provide feedback to the user to guide the user to the starting point at the chest. The mobile device of the user may provide auditory, visual, or tactile feedback to the user. The feedback may indicate how close the mobile device is to the starting point. The feedback may be an indication of proximity to one or more body areas, or reference portions. This feedback may provide an indication if the mobile device should be raised lower or higher, if the mobile device should be moved left or right, or if the mobile device is at the right starting location. Once the user starts moving the mobile device, the mobile device may provide feedback if the device is on the correct path. The mobile device may provide feedback if the mobile device should be moved in a specific direction to keep the device in the correct path to measure the reference portion. For example, when measuring the circumference of the torso, it may be challenging for a user to take measurements in a single plane when the user switches the mobile device from one hand to another when the device is on the back of the user. In such a case, auditory or tactile feedback may be provided to the user to ensure that the user maintains the mobile device on the correct path even when the user cannot see the mobile device during supplemental measurement.

The supplemental measurement may be performed in an interactive mode or during an AR session and generate an indication that the user is off track from what is expected. In some embodiments, measurements may be provided in relation to previously recorded video or images taken at a different time and/or using different devices.

In some embodiments, a second person may take or assist with obtaining supplemental measurements for a person. In some instances, a person might not be able or may not be willing to take the required supplemental measurement due to limited mobility. A second person may use their own mobile device, or a mobile device associated with the person subject to the measurements or another mobile device, to take supplemental measurements.

In some embodiments, two or more devices may be used for taking supplemental measurement and providing feedback during supplemental measurement. As described herein, the sensors of one device, such as a mobile device, may be used to take measurements when the device is moved in relation to a reference portion of the body. During the movement of the mobile device along a reference portion of a body, the mobile device may include the movement of the reference portions of the body. A second device may be used to monitor the relative position of the mobile device and the body of the person. A camera of the second device may be used to monitor the relative location of the mobile device and any motion of the body. The second device may be a second mobile device, a computer, a smart mirror, or any other device with a camera. The second device may monitor the motion or movement of the reference portion of the body during measurement. Measurement of the movement of the reference portion of the body may be used to subtract the body movement component of the mobile device sensor readings.

In some embodiments, a device may use one or more laser sources, light sources, and/or illumination sources to determine the shape and position of objects such as body parts. In some embodiments, at least one structured-light camera may be used. A structured-light camera may project patterns of light onto objects and analyze distortions in the reflection. Patterns of light may be distorted by a three-dimensional object due to the shape of the object. The distorted reflected light patterns can reveal the proximity, motion, or contours of an object and may be used to determine the shape and motion of a body part during measurement. Distorted light patterns that are projected onto a body part may be captured by a camera from different angles or positions to determine the 3D shape of the body part.

In some embodiments, time-of-flight sensors or camera may be used. Time-of-flight sensors or cameras may measure the time it takes for light to travel to and from an object as a way to discern its distance. A light source, such as a laser, may be projected onto different areas of a body part to determine the distance of the areas from a camera using time of flight of the laser. Based on the distance of the areas from the camera the shape and size of the body part may be determined.

In some embodiments, active stereo vision may be used. Active stereo vision may combine two or more types of cameras, such as near-infrared cameras, to triangulate the location and movements of an object such as a body part. In embodiments, an object may be captured in images from two or more vantage points. The differences in the vantage points may be used to extract 3D information. In some embodiments, a laser such as an infrared laser, may be used to illuminate an object while images are captured from two or more vantage points.

Short range infrared sensors, cameras and infrared sources such as lasers, illumination sources, and lamps may be used to map a body part over two or more planes. The mapped body parts may be overlaid onto a captured AR image. For example, the shape of an arm, may be determined using infrared sources and detectors using one or more structured-light cameras, time-of-flight sensors, and/or active stereo vision systems. The shape of an arm may be captured from two or more planes or vantage points such that a 3D model or a 3D surface model may be generated of the arm or parts of the arm. The model may be shown in a captured AR image and may be overlaid over AR images.

In embodiments, imaging techniques for measuring body parts, determining shape of body parts, determining motion of body parts may be based one or more techniques that use stereo imaging, structured light, interferometry, time of flight, and the like.

For example, supplemental measurements may be taken of the arm of a person by sensing the movement of a mobile device along the arm. A user may position a mobile device at the wrist, and, while making contact with the arm, the device may be moved along the arm toward the shoulder area of the arm. During the measurement, it might be difficult for the person to keep the arm perfectly still while the mobile device is moved along the arm. If the user moves the arm or the whole body during the measurement of the arm, the sensors of the mobile device may record the motion associated with the length of the arm and the additional motion associated with the movement of the arm or the body. In some embodiments, additional movement of the arm or body may be indistinguishable or difficult to compensate for using only sensor readings of the mobile device. The additional movement may cause errors in the supplemental measurement since the supplemental measurement may reflect the movement of the device along the reference portion of the body and the movement of the arm or body of the person during the supplemental measurement process. A second device may be used to detect the motion of the reference portion of the body during the measurement. The second device may use a camera to detect movement of the reference portion of the body. In some embodiments, when movement is detected, an alert may be provided to the user to stop moving or to restart the supplemental measurement. In some embodiments, when movement is detected the magnitude of the movement, the time of the movement, the direction of the movement, and the like may be captured. The captured movement of the reference portion of the body may be used to remove or compensate for the motion component (such as recorded or detected by the mobile device) that is attributed to or caused by the movement of the body.

A second device may be used to monitor the position of the mobile device when the supplemental measurements are being taken. A camera on the second device may monitor the position or location of the mobile device with respect to the body of the person. The second device may monitor the location and provide feedback to the user regarding the position. The feedback may be in relation to the starting point of the supplemental measurement, the path of the measurement, or the endpoint of the measurement.

Figure 6:
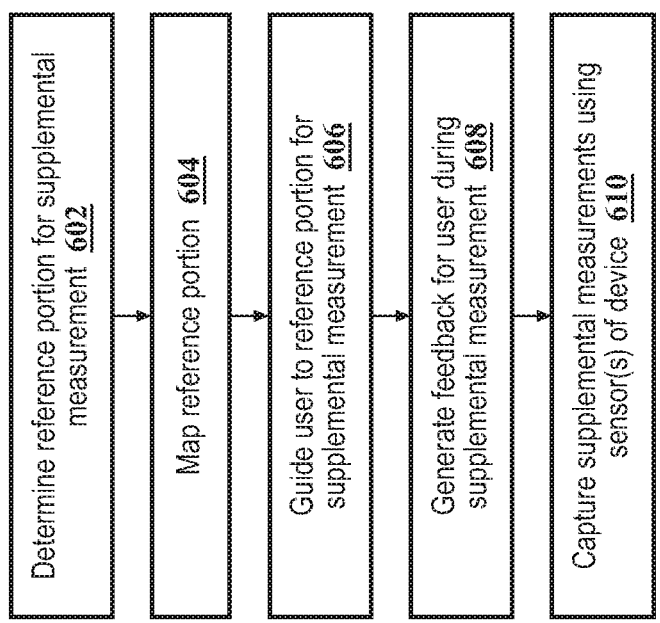
FIG. 6 depicts an embodiment of a process for taking supplemental measurements.

FIG. 6 depicts an embodiment of a process for taking one or more supplemental measurements. In step 602, at least one reference portion to take one or more supplemental measurements may be determined. The at least one reference portion may be selected based on detected error models, selected by the user, or randomly selected. In step 604, at least one reference portion may be mapped to the position of the mobile device. In an AR environment, the mobile device may maintain a set of coordinates related to the captured images, objects in the captured images, features, or other environmental objects. The coordinates or relative locations of the reference portion(s) may be mapped to the coordinates of the mobile device. In step 606, the relative position of the mobile device with respect to a reference portion may be calculated with respect to the determined coordinates of the mobile device and the determined coordinates of the at least one reference portion. In step 608, feedback signals may be generated to provide an indication as to where at least one reference portion is with respect to the mobile device. In step 610, the one or more supplemental measurements may be captured when the coordinates of the mobile device are in the determined location of a reference portion.

Referring to FIG. 3A, once the supplemental measurements are taken 312, at least one correction factor may be determined 314 using the supplemental measurements. The at least one correction factor may further be used to correct one or more initial measurements to determine one or more corrected measurements 316.

In embodiments, a correction factor may be a single value, a series of values and properties or a model. A correction factor may be a number that is used to multiply one or more initial measurements to determine corrected measurements. A correction factor may be a number or a function that is applied to the one or more initial measurements to determine corrected measurements. A correction factor may be applied equally for each measurement, vary by measurement or category of measurement, apply to all measurements, or only a subset.

A correction factor may be determined based at least in part on the differences between a supplemental measurement and initial body measurements determined from initial body images. A correction factor may be determined based, at least in part, on detected clothing and associated clothing models. A correction factor may further be determined based at least in part on detected initial captured image distortions, angles, lighting artifacts and the like. A correction factor may further be determined based, at least in part, on detected discrepancies of initial body measurements.

In embodiments, when there is a difference in the measurements between the initial body measurements and the supplemental measurements, an error model may be used to determine how the differences between specific body measurements may relate or affect other body measurements.

When one or more initial body measurements and supplemental measurements of a body do not match or differ by more than a threshold, the system may determine the likely source of the error. An error model may be determined based at least in part on features or distortions detected in the initial captured images which correspond to the areas of the initial body measurements and supplemental measurements. In embodiments, features, or distortions of the areas of the initial captured images for which the initial body measurements do not match the supplemental measurements may be analyzed to determine if the error is likely due to poor image quality, image distortions, or clothing worn by the user. Based on the detected features or distortion, one or more appropriate error models may be selected.

For example, when an initial body measurement does not match a supplemental measurement, the area of the initial captured images that were used to determine the initial body measurements may be analyzed to determine what types of distortions or clothing features are present in the area corresponding to the measurements. If the area in the initial images is found to have lighting distortions, an error model may be selected, which specifies what types of corrections should be performed. The error model associated with bad lighting may reflect data or previous experience of how bad lighting typically affects measurements. For example, it may be determined, based on past experience or simulation, that bad lighting may affect all measurements equally. The error model for bad lighting may, therefore, specify that the error in initial body measurement and supplemental body measurements is likely similar for all initial body measurements. In such an error model, a correction factor which is determined from the difference of the initial body measurement and supplemental measurement for a body part may be applied equally to all initial body measurements.

In another example, if the area in the initial images is found to include a specific type of clothing, an error model may be selected that is related to the type of clothing detected. For example, if a sweater is detected, the error model associated with the sweater may reflect data or previous experience of how an article of clothing like a sweater typically affects initial body measurements. It may be determined, based on past experience or simulation, that a sweater may affect all measurements of body parts that are covered by the sweater. The error model, in this case, may specify that the error in initial body measurement and supplemental body measurements is likely similar for all initial body measurements that are covered by the sweater. In such an error model, a correction factor which is determined from the difference of the initial body measurement and supplemental measurement for a body part may be applied equally to all initial body measurements that are covered by the sweater. In another example, a vest may be detected in the images. The error model associated with the vest may reflect data or previous experience of how an article of clothing like a vest typically affects initial body measurements. It may be determined, based on past experience or simulation, that a vest may affect all measurements of body parts that are covered by the vest. The error model, in this case, may specify that the error in initial body measurement and supplemental body measurements is likely similar for all initial body measurements that are covered by the vest. In such an error model, a correction factor which is determined from the difference of the initial body measurement and supplemental measurement for a body part may be applied equally to all initial body measurements that are covered by the vest. Other body parts, such as arms, that are not covered by the vest may have a different correction factor or possibly no correction factor applied.

In another example, if a dress is detected in the initial captured images, the error model specific to the dress may be selected. The error associated with the dress may reflect data or previous experience of how an article of clothing like a dress typically affects initial body measurements. It may be determined, based on past experience or simulation, that a dress may have minimal effect on body measurements in the torso and large effects on initial body measurements in the lower body area. The error model, in this case, may specify that the error in initial body measurement and supplemental body measurements is likely different for the upper body and lower body measurements. In such an error model, a correction factor which is determined from the difference of the initial body measurement and supplemental measurement for a body part may be applied differently based upon the location of the body part.

Figure 7:
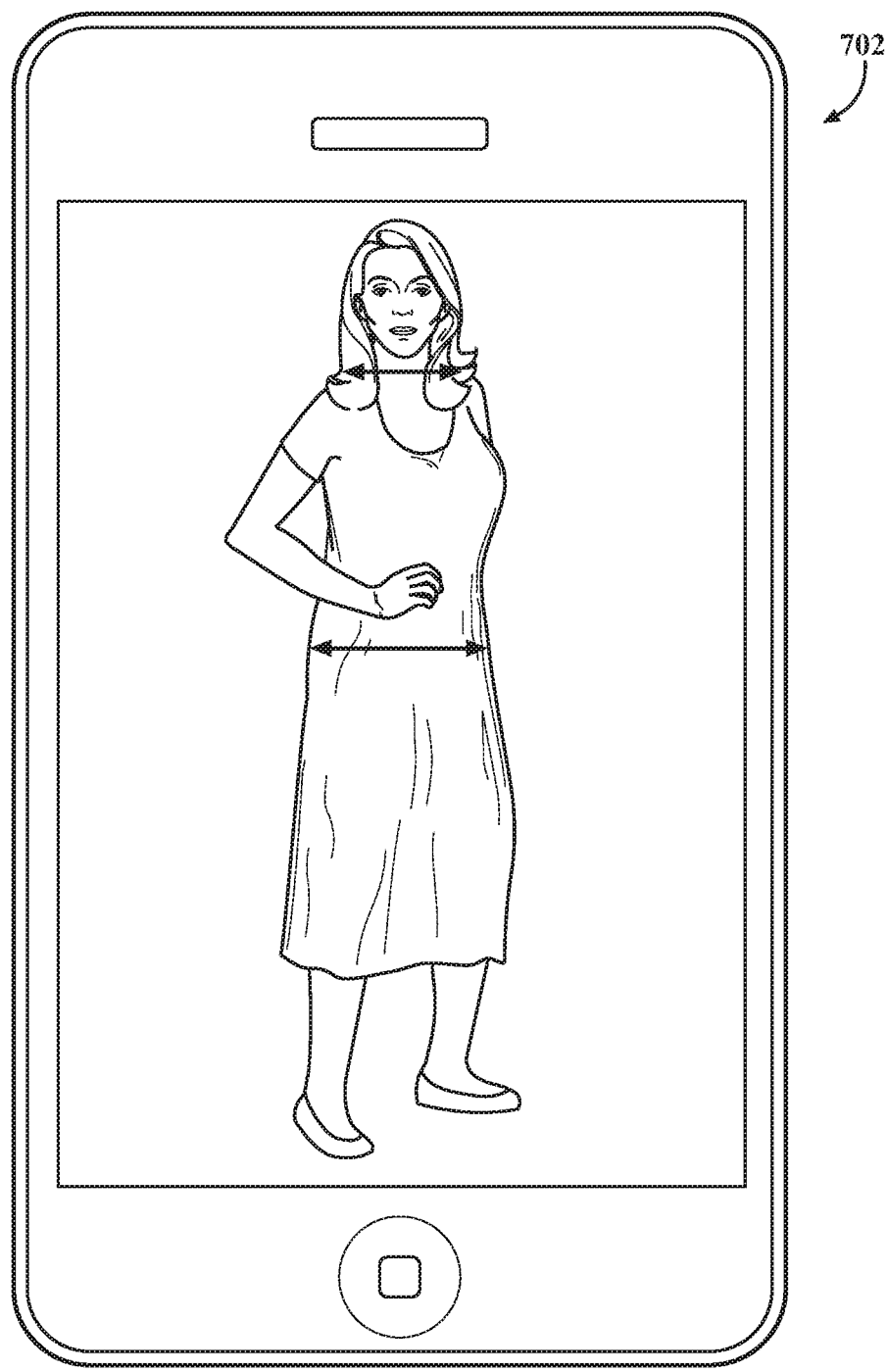
FIG. 7 depicts an embodiment of an interface for reviewing body measurements.
Figure 8:
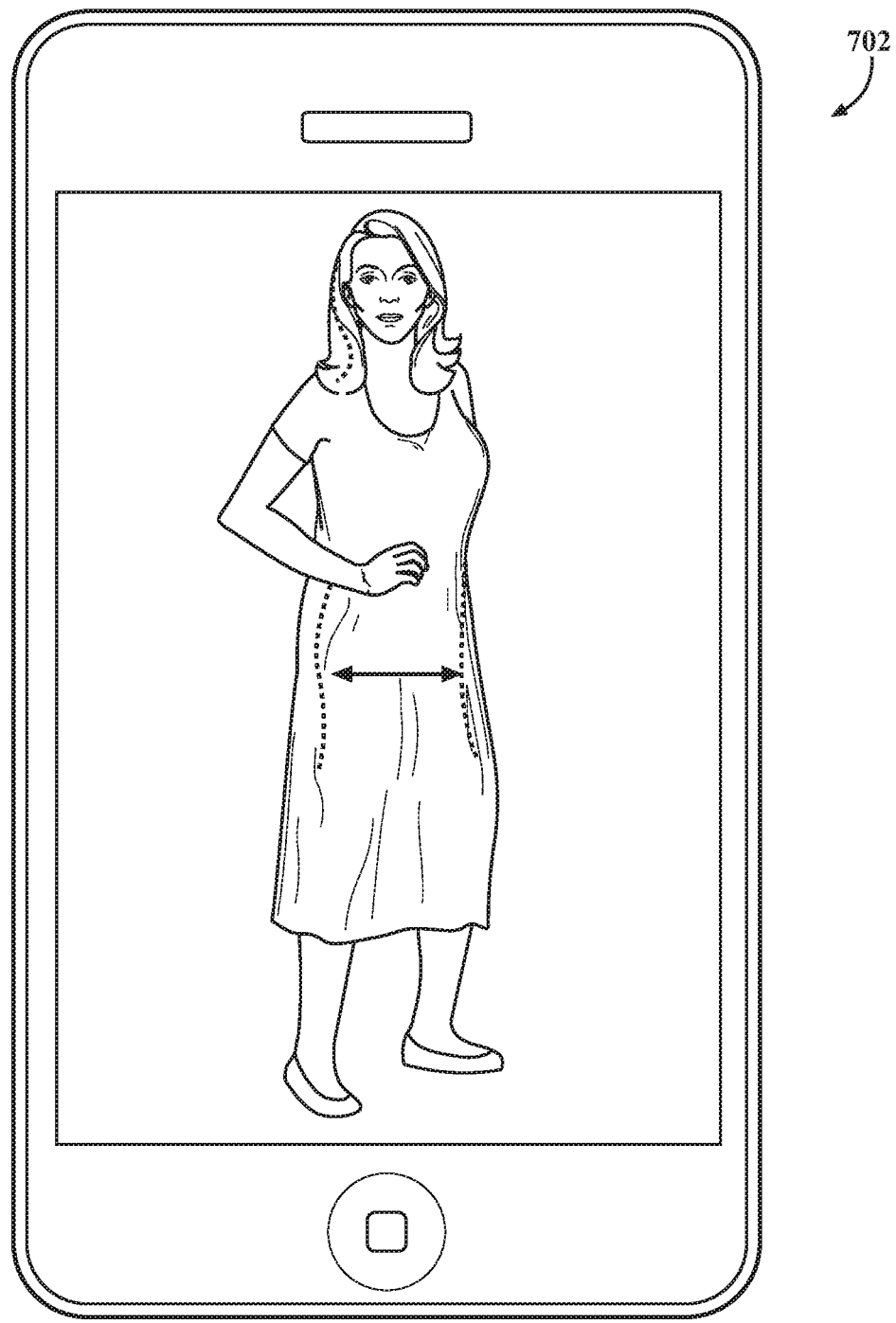
FIG. 8 depicts an embodiment of an interface for reviewing body measurements.

In embodiments, once a correction factor is determined, corrected measurements may be automatically applied to the initial body measurements without user notification. In some embodiments, feedback or notification may be provided to the user to notify a user of a correction and/or correction factor and/or obtain further input from a user. For example, an interface may be displayed on a mobile device 702 to the user, as shown in FIG. 7. The interface may be displayed on a mobile device 702 and show a silhouette or one or more initial captured images that were used for initial body measurements. The interface may show an outline of the body determined from the images. In some embodiments the outline in the interface may be moved or dragged by the user to adjust the measured dimensions. The image may be modified, as shown in FIG. 8, with indications of areas where the initial body measurements were corrected. The indications may be an overlay of a modified silhouette over the captured image, which shows how the determined corrected measurements relate to the image. In some embodiments, the interface may allow the user to select specific areas or indications of corrections and specify that the corrections appear correct or incorrect. An indication that the corrected measurements do not appear to be accurate may cause the system to execute one or more previous steps, such as taking supplemental measurements or determining initial body measurements.

Figure 9:
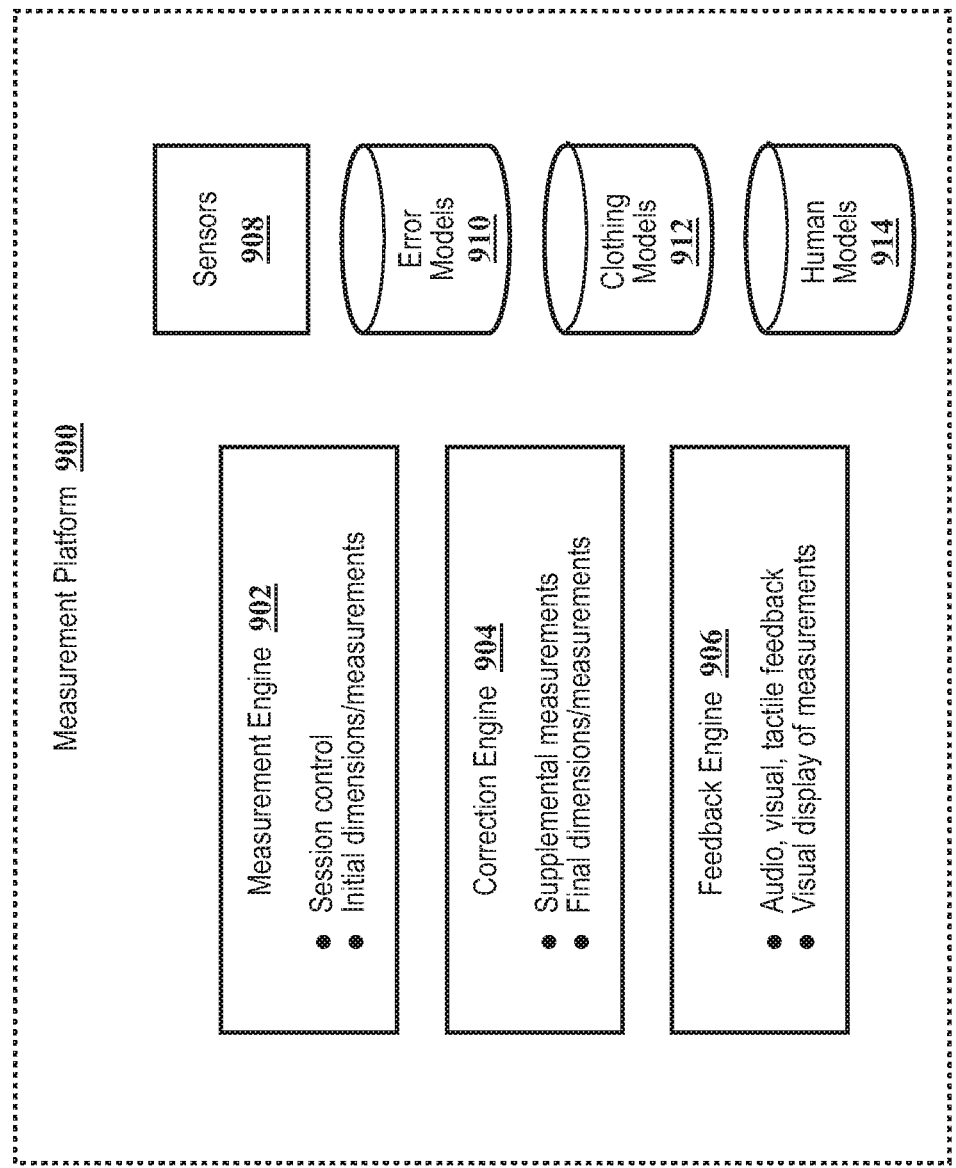
FIG. 9 depicts an embodiment of a measuring architecture.

The methods described herein, such as the methods depicted in FIG. 3A, may be implemented via a measurement platform. An embodiment of the architecture of the measurement platform 900, which may be part of the e-commerce platform 100, is depicted in FIG. 9. In embodiments, elements of the platform 900 may be in one device, such as the user device or a smart mirror. In embodiments, elements of the platform 900 may be distributed between two or more devices, such as a server and a mobile device, or multiple user devices.

The measuring platform 900 may include a measurement engine 902. The measurement engine 902 may include circuits, algorithms, and/or code executed on a processor. The measuring engine may receive captured images to determine initial body measurements from the images. The engine may have control of the camera (or processing of images), allowing control of contrast, saturation, frame rate, resolution, to capture appropriate images. The measurement engine 902 may provide control and feedback for an AR session associated with the measuring. The measurement engine 902 may further process any additional images or sensor readings to determine supplemental measurements.

The measuring platform 900 may include a correction engine 904. The correction engine 904 may include circuits, algorithms, and/or code executed on a processor. The correction engine may analyze images to determine possible sources of error due to clothing, lighting, behavior of textiles, and the like. The engine 904 may determine the reference portions that should be used to take supplemental measurements. The engine 904 may use clothing models, error models, and human models to correct initial body measurements based on the supplemental measurements.

The measuring platform 900 may include a feedback engine 906. The feedback engine 906 may include circuits, algorithms, and/or code executed on a processor. The feedback engine may provide, generate, or manage user interfaces and visual, audio, tactile, or other feedback to the user. Feedback may be provided or generated by engine 906 during the taking of supplemental measurement. The engine 906 may provide interfaces such as to display magnitudes of corrections of initial body measurements.

The measuring platform 900 may include data models such as one or more of error models 910, clothing models 912, and human models 914. Error models 910 may include data related to errors (including related signatures) in initial body measurements. In embodiments, initial body measurements may not correspond to human models. Discrepancies between human models and initial measurements may be used to determine causes of errors. Discrepancies may indicate that the errors may be due to bad lighting, image jitter, clothing, image angles relative to the person, and the like. Clothing models 912 may include data related to specific types or styles of textiles, fabric, clothing, or clothing material and how they may affect measurements. For example, a tight-fitting sweater may uniformly enlarge the torso and arm of a person, while a dress may impact the measurements non uniformly with a greater impact on measurements below the waist; data related to images (and related signatures) for different styles or textile, clothing or fabric types such that they can be detected in the images. A human model 914 may include data related to the expected proportions of a person. Data may be specified in relation to age, gender, weight, etc. of a person. Human models 914 may be related to image signatures for different body types, age, gender and the like such that they can be detected in images.

In embodiments, the measuring platform 900 may include sensors 908. The sensors may be a sensor in a user device and/or in another device such as a smart mirror or an additional computer and may be as described herein.

FIG. 10 illustrates a system 1000 for facilitating accurate body measurements, according to one embodiment. The system 1000 may include one or more of different user devices 1002, 1004. In FIG. 10, each user device may be associated with different users, but more generally, some users may have more than one user device. A user device 1002 is a device used by a user to take initial and/or supplemental measurements and/or provide a user interface to the user. A user device 1002 may communicate with other user devices 1004 over a network 1006. In embodiments where multiple user devices are used to take images for initial body measurements or to take supplemental measurements, the user devices may communicate to share data related to the tasks. For example, user devices 1002, 1004 may be mobile phones, tablets, laptops, personal computers, or smart mirrors. The user device may be a device owned by the user or available to the user at a merchant or store such as a smart mirror.

A user device 1002 may include a user interface 1008. An example of a user interface is a display screen (which may be a touch screen), and/or a keyboard, and/or a mouse, and/or microphone and/or speakers. A user device 1002 further includes a network interface 1010 for communicating over the network 1006. The network 1006 may be one or more different networks. Communication between user devices 1002, 1004 may be implemented with various protocols and technologies such as Bluetooth network or NFC that provides a direct link between devices or may be routed via existing wireless or wired networks. The processor 1012 may be one or more processors that execute instructions stored in memory 1014. Alternatively, some or all of the processor(s) 1012 may be implemented using dedicated circuitry, such as an application specific integrated circuit (ASIC), a graphics processing unit (GPU), or a programmed field programmable gate array (FPGA). The memory 1014 may include program code for an application that executes on the user device 1002 and provides functions and user interfaces for taking measurements using the user device. The processor 1012 may execute applications for at least partially performing functions associated with a measurement platform 900 and may be used to perform all or a portion functions associated with the measurement engine 902, correction engine 904, and feedback engine 906 or the measurement platform 900.

In embodiments, the system 1000 may further include an e-commerce platform 100. The e-commerce platform 100 may include one or more application servers 1024, which is a server that executes an application that facilitates taking measurements using the user devices 1002, 1004. The application server 1024 may include processing resources 1018. The processing resources 1019 may be implemented by one or more processors that execute instructions stored in the memory. Alternatively, some or all of the processing resources 1018 may be implemented using dedicated circuitry, such as an ASIC, GPU, or FPGA. The processing resources 1018 may include applications for at least partially performing functions associated with a measurement platform 900 and may be used to perform all or a portion functions associated with the measurement engine 902, correction engine 904, and feedback engine 906 or the measurement platform 900.

In embodiments, the application server 824 may further include a model storage 816, which may be a component of the e-commerce platform 100 that maintains data relating to the models used for body measurement by the measurement platform 900. Models storage 1016 may include storage, such as databases, file systems, and memory for storing and maintaining error model 910, clothing models 912, and human models 914 that are associated with the measurement platform 900. The model storage 1016 may transmit one or more specific models to the user device 1002.

The application server 1024 further includes a network interface 1022 for communicating over the network 1006. The application server 1024 may communicate data related to the body measurements to the one or more devices 1002, 1004. The network 1006 may be one or more different networks. Communication between user devices 1002, 1004, and application server 1024 may be implemented with various protocols and technologies such as WiFi, Ethernet, fiber networks, satellite networks, and the like.

The application server 1024 may further include an API 1020 for receiving requests for data from the user devices 1002, 1004 and for providing the requested data to the user devices 1002, 1004 via the network 1006. The API 1020 is shown as a separate component, but it may be implemented by the processing resources 1018 and the network interface 1022. For example, the structure of the 1020 may include the processing resources 1018 and network interface 1022, where the processing resources 1018 executes instructions that cause the processing resources 1018 to receive API calls through the network interface 1022, to obtain the data requested in the API call, and to send the requested data through the network interface 1022.

Although the preceding examples primarily relate to determining accurate body measurements of a person, the methods, design, and systems described above may be used to determine accurate measurements of any objects or bodies. The methods described herein may be used to correct initial measurements of objects for which dimensions are difficult to measure from image data due to covering, image distortions, or other obstructions.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include $4^{th}$ Generation (4G) networks (e.g. Long Term Evolution (LTE)) or $5^{th}$ Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A computer-implemented method comprising:
receiving one or more images of a body in which at least one portion of the body is covered by clothing in at least some of the one or more images;
determining one or more initial body measurements of the body based on the one or more images;
determining at least one supplemental measurement of a portion of the body, the supplemental measurement determined at least in part using one or more sensors of a mobile device;
determining, based on the supplemental measurement, a correction factor associated with the clothing, wherein the correction factor compensates for body distortions due to the clothing on the body; and
applying the correction factor to the one or more initial body measurements of the body to produce a corrected body measurement.

2. The method of claim 1, further comprising sending a size recommendation to a user device based on the corrected body measurement.

3. The method of claim 1, wherein the supplemental measurement is determined from detecting movement of the mobile device using the one or more sensors.

4. The method of claim 1, wherein the supplemental measurement is determined from a movement of the mobile device using a camera of the mobile device.

5. The method of claim 1, wherein the supplemental measurement is determined from additional images captured by the mobile device.

6. The method of claim 1, further comprising:
receiving sensor data from a second device, wherein the sensor data from the second device comprises information regarding at least one of a location of the mobile device, a position of the mobile device, a location of at least a portion of the body, or a position of at least a portion of the body.

7. The method of claim 1, further comprising:
selecting the portion of the body to take the supplemental measurement; and
providing a feedback instruction to the mobile device, the feedback instruction providing an indication of proximity of the mobile device to the portion of the body, wherein the feedback instruction is based at least in part on data from the one or more sensors from a second device.

8. The method of claim 1, further comprising:
selecting the portion of the body for the supplemental measurement; and
providing a feedback instruction to the mobile device, the feedback instruction providing an indication of proximity of the mobile device to the portion of the body.

9. The method of claim 8, wherein the feedback instruction is associated with at least one of an audio, tactile, or visual notification.

10. The method of claim 1, wherein the correction factor is based at least in part on a difference between the supplemental measurement and the one or more initial body measurements of the body.

11. The method of claim 1, wherein the correction factor is determined for initial body measurements associated with at least one portion of the body covered by at least one textile.

12. The method of claim 1, wherein the correction factor is based at least in part on a difference between the supplemental measurement and the one or more initial body measurements of the body and a style of clothing covering at least a portion of the body.

13. The method of claim 1, wherein the correction factor is based at least in part on a difference between the supplemental measurement and the one or more initial body measurements of the body and a type of textile covering the body.

14. A system comprising:
a computing device associated with an image processor, the computing device configured to store a set of instructions that, when executed, cause the computing device to:
receive one or more images of a body in which at least one portion of the body is covered by clothing in at least some of the one or more images;
process the one or more images to determine one or more initial body measurements of the body;
determine at least one supplemental measurement of at least one portion of the body, the at least one supplemental measurement determined using one or more sensors of a mobile device; and
determine a correction factor for the one or more initial body measurements of the body using the at least one supplemental measurement, wherein the correction factor compensates for body distortions due to the clothing.

15. A computer-implemented method for correcting body dimensions determined from images, comprising:
receiving one or more images from a computing device, wherein the one or more images depict a body at least partially covered by clothing;
determining feature data corresponding to each of the one or more images;
determining at least one initial body measurement of the body from the feature data;
transmitting an indication to the computing device to obtain at least one supplemental measurement of at least one portion of the body;
receiving the at least one supplemental measurement;
determining a correction factor for the at least one initial body measurement of the body using the at least one supplemental measurement, the correction factor compensating for body distortions due to the clothing;
correcting the at least one initial body measurement using the correction factor; and
transmitting the corrected at least one initial body measurement to the computing device.

16. The method of claim 1, wherein the correction factor compensates for body distortions due to at least one of a pleat, crease, or a fold of the clothing.

17. The method of claim 1, wherein determining the at least one supplemental measurement of a portion of the body further comprises determining at least one of a location of a start or end of a body part that is at least partially obscured by the clothing.

18. The method of claim 1, further comprising:
analyzing the one or more images of the body to determine a type of the clothing on the body; and identifying, based on the type of the clothing, at least one location on the body for the supplemental measurement.

19. The method of claim 1, wherein determining the at least one supplemental measurement of a portion of the body further comprises determining a distance the clothing extends perpendicularly away from the surface of the body.

20. The method of claim 1, wherein determining the at least one supplemental measurement of a portion of the body further comprises determining at least one of a thickness of a textile of the clothing or a stiffness of a textile of the clothing.

* * * * *